US012792201B1

(12) United States Patent
Soni et al.

(10) Patent No.: US 12,792,201 B1
(45) Date of Patent: Nov. 10, 2026

(54) COMMUNICATIONS SYSTEM WITH ACCOUNT DATA INTEGRATION

(71) Applicant: 8x8, Inc., Campbell, CA (US)

(72) Inventors: Dhwani Soni, Campbell, CA (US); Jinal Vichhivora, Newark, CA (US); Stefania Trif, Cluj-Napoca (RO); Bimba Rao, Campbell, CA (US); Ilona Farkas, Cluj-Napoca (RO); David Szabo, Campbell, CA (US); Geoffrey White, Campbell, CA (US); Yiruo Zhao, Campbell, CA (US); Oliver Reeve, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 341 days.

(21) Appl. No.: 18/216,706

(22) Filed: Jun. 30, 2023

Related U.S. Application Data

(60) Provisional application No. 63/357,769, filed on Jul. 1, 2022.

(51) Int. Cl.
*G06F 3/0484* (2022.01)
*G06F 3/0482* (2013.01)

(52) U.S. Cl.
CPC .......... *G06F 3/0484* (2013.01); *G06F 3/0482* (2013.01)

(58) Field of Classification Search
CPC ............................. G06F 3/0484; G06F 3/0482
See application file for complete search history.

(56) References Cited

U.S. PATENT DOCUMENTS

| | | | |
|---|---|---|---|
| 5,473,732 | A | 12/1995 | Chang |
| 6,424,935 | B1 | 7/2002 | Taylor |

(Continued)

FOREIGN PATENT DOCUMENTS

| | | | | |
|---|---|---|---|---|
| WO | WO-03100591 | A2 * | 12/2003 | ............. G06F 15/02 |
| WO | 2022/240433 | A1 | 11/2022 | |
| WO | 2022/256028 | A1 | 12/2022 | |

OTHER PUBLICATIONS

TheSandWraith: How to merge iOS messages conversation feed? Apple Inc., https://discussions.apple.com/thread/6566339, 4 pages (Sep. 27, 2014).

(Continued)

*Primary Examiner* — William L Bashore
*Assistant Examiner* — Gregory A Distefano
(74) *Attorney, Agent, or Firm* — Vista IP Law Group, LLP

(57) ABSTRACT

Aspects of the disclosure are directed to apparatuses, systems and methods involving a user interface (UI) that displays respective sections of a FoV (field of view) for each of a plurality of endpoint devices. Operational opportunities characterized by data sets generated by a plurality of applications are synchronized based on an identification associated with the endpoint devices, characteristics of the operational opportunities and search characteristics input to the endpoint devices. The synchronized data sets corresponding to the operational opportunities and one of the endpoint devices are displayed thereat via the UI. In response to selection of one of the operational opportunities, data characterizing a selected operational opportunity in an interaction panel. While the operational opportunities and data characterizing the selected operational opportunities are displayed, further data is displayed via the UI and modified based on contextual aspects of user interaction with the UI and the selected operational opportunity.

20 Claims, 7 Drawing Sheets

(56) References Cited

U.S. PATENT DOCUMENTS

| | | | |
|---|---|---|---|
| 7,236,932 | B1 | 6/2007 | Grajski |
| 8,775,332 | B1 * | 7/2014 | Morris ..................... G06N 5/02 706/11 |
| 8,788,535 | B2 | 7/2014 | Bonev et al. |
| 9,619,845 | B2 * | 4/2017 | Chakraborty .......... G06Q 10/06 |
| 10,142,329 | B1 | 11/2018 | Liu |
| 10,318,617 | B2 | 6/2019 | Gelfand et al. |
| 10,616,345 | B1 | 4/2020 | Quimette et al. |
| 10,735,592 | B1 | 8/2020 | Liu et al. |
| 10,939,179 | B2 | 3/2021 | Park et al. |
| 10,949,619 | B1 | 3/2021 | Arsanjani et al. |
| 10,994,800 | B2 | 5/2021 | Noguchi et al. |
| 11,025,488 | B1 | 6/2021 | Arsanjani et al. |
| 11,044,338 | B1 | 6/2021 | Arsanjani et al. |
| 11,070,640 | B1 | 7/2021 | Arsanjani et al. |
| 11,196,866 | B1 | 12/2021 | Samat et al. |
| 11,425,252 | B1 | 8/2022 | Martin et al. |
| 11,445,063 | B1 | 9/2022 | Driemeyer et al. |
| 11,539,541 | B1 | 12/2022 | Driemeyer et al. |
| 11,551,005 | B1 | 1/2023 | Arsanjani et al. |
| 11,575,755 | B1 | 2/2023 | Arsanjani et al. |
| 11,575,791 | B1 | 2/2023 | Arsanjani et al. |
| 11,622,043 | B1 | 4/2023 | Samat et al. |
| 2003/0055974 | A1 | 3/2003 | Brophy et al. |
| 2004/0143482 | A1 * | 7/2004 | Tivey ................... G06Q 30/018 705/317 |
| 2004/0143559 | A1 | 7/2004 | Ayala |
| 2008/0086564 | A1 | 4/2008 | Putman et al. |
| 2009/0112875 | A1 | 4/2009 | Maes |
| 2009/0276215 | A1 | 11/2009 | Hager |
| 2010/0246800 | A1 | 9/2010 | Geppert et al. |
| 2011/0046960 | A1 | 2/2011 | Spier et al. |
| 2013/0066677 | A1 * | 3/2013 | Killoh ................ G06Q 30/0277 705/7.29 |
| 2014/0046792 | A1 * | 2/2014 | Ganesan ............ G06Q 30/0611 705/26.4 |
| 2014/0100848 | A1 | 4/2014 | Shaffer et al. |
| 2014/0123072 | A1 * | 5/2014 | Bhowmick ........... G06F 3/0482 715/838 |
| 2015/0032675 | A1 * | 1/2015 | Huehn ................... G06N 20/00 707/740 |
| 2015/0100364 | A1 * | 4/2015 | Friedman ....... G06Q 10/063118 705/7.17 |
| 2015/0120395 | A1 * | 4/2015 | Bellini, III ......... G06Q 10/0637 705/7.36 |
| 2015/0143248 | A1 * | 5/2015 | Beechuk ............... G06F 3/0482 715/739 |
| 2015/0350443 | A1 | 12/2015 | Kumar et al. |
| 2015/0379602 | A1 * | 12/2015 | Gupta ................ G06Q 30/0617 705/26.43 |
| 2016/0078142 | A1 * | 3/2016 | Gorny ................. G06F 16/9535 707/748 |
| 2016/0095056 | A1 | 3/2016 | Lebon-schneider et al. |
| 2016/0227035 | A1 | 8/2016 | Kumar et al. |
| 2016/0349960 | A1 | 12/2016 | Kumar et al. |
| 2017/0006161 | A9 | 1/2017 | Riahi et al. |
| 2018/0234550 | A1 | 8/2018 | Lifson et al. |
| 2018/0315000 | A1 | 11/2018 | Kulkarni et al. |
| 2019/0215249 | A1 | 7/2019 | Renard et al. |
| 2020/0342850 | A1 | 10/2020 | Vishnoi et al. |
| 2021/0350390 | A1 * | 11/2021 | Strong, II .......... G06Q 30/0201 |
| 2022/0308720 | A1 | 9/2022 | Korzhenevich et al. |

OTHER PUBLICATIONS

Alex Heath. Merge Clears Up Confusion by Combining iMessages From Multiple Device IDs Right In iOS [JailbreakCon]. https// www.cultofmac.com/category/news/, 9 sheets (Sep. 29, 2012).

8x8, "8x8 Frontdesk", https://www.8x8.com/products/business-phone/frontdesk?locale=us&utm_medium=paid-search&utm_source=google&utm_campaign=elite&utm_adgroup=Google_US_Search_Brand_Frontdesk| AAA_8x8_Frontdesk&utm_term=8x8%20front%20desk&type=Google_US_Search_Brand_Frontdesk&gclid=Cj0KCQiA4b2MBhD2ARIsAlrcB-RkZXOwVjVgTkcRcA_XSIAMzBFL5JJvV7M7xi9_fCrXSVOIZamU5OUaAii8EALw_wcB, downloaded Apr. 25, 2023.

8x8, "8x8 Work", https://www.8x8.com/products, downloaded Apr. 25, 2023.

8x8, "8x8 Work", https://www.8x8.com/products, downloaded Aug. 2023.

8x8 Admin Console, "Set up call park extension." 8x8, Inc. (2022), 1 sheet. https://docs.8x8.com/8x8WebHelp/admin-console/Content/Set_up_Call_Park_Extension.htm.

USPTO. Final Office Action dated Aug. 16, 2024, received for U.S. Appl. No. 17/839,157 of the instant Applicant/Assignee.

USPTO. Office Action dated Jun. 25, 2024, received for Design U.S. Appl. No. 29/842,406 of the instant Applicant/Assignee.

* cited by examiner

COMMUNICATIONS SYSTEM WITH ACCOUNT DATA INTEGRATION

CROSS-REFERENCE TO RELATED APPLICATIONS

Aspects of various embodiments are directed to apparatuses (e.g., systems, devices, etc.) and to methods such as those described in the claims, description or figures herein and in U.S. Provisional Patent Application Ser. No. 63/357,769 filed on Jul. 1, 2022, to which priority is claimed and which is fully incorporated herein by reference. For information regarding details of other embodiments, experiments and applications that can be combined in varying degrees with the teachings herein, reference may be made to the teachings and underlying references provided in Appendices 1-2 that form part of the above-mentioned Provisional Patent Application.

OVERVIEW/BACKGROUND

In data-communications systems/platforms providing data communications as a service to client entities and their leadership personnel (e.g., supervisors, managers, directors and other group and/or business leaders), integrating data from multiple different applications and sources for access, processing and use can be challenging. For instance, multiple disparate systems and data sets pertaining to different operational opportunities may be relevant to a particular user, however providing access thereto in an efficient manner can be challenging. As another example, managing operations involving the provision of a particular type of system and/or service to may require usage of a variety of different applications/services at once (in a concurrent or simultaneous manner). This can lead to information loss or corruption, especially during transfer of information, and can be difficult to execute properly and efficiently. Further, presenting disparate sets of data pertaining to different such opportunities in a manner that provides a user with a field of view in which relates such opportunities can be assessed and carried out can be particularly challenging when the disparate sets of data are provided via different platforms/systems that otherwise do not operate together.

SUMMARY

In exemplary contexts, aspects of the present disclosure are directed to user-interface display aspects wherein the display may be used by an account executive and may be opportunity driven (one or more of these aspects may be referred to as an "Account Executive" system, method or feature). According to such an account executive system, method or feature, there are composed user-experiences (aka UX such as one having multiple panes in one UX view) to enable real-time (or near real-time) review of status of opportunities/deals so agents can efficiently manage deals and track status at any stage (e.g., from conception to closing).

Further, according to aspects of the present disclosure, intelligent, interactive, composed UX design improves processing efficiency (devices and users), delivery of information, productivity, synchronization between apps/services (including integrated channels). The account-executive system, method and/or feature can have a standard UX design or can be customized by users with ability to show core UX panes, add on panes, change panes in real-time when there are updates, etc. Further, The account-executive system, method and/or feature is able to: retrieve deals/opportunities from one or more integrated channel(s), for example, deal leads retrieved from customer relationship management database/app/service (e.g., Salesforce); provide channels which could also be other modalities communications received from other departments (e.g., marketing), via such as email, messaging, etc.; provide leads received through websites, etc. As an example, deals could be sale of products and services by third parties/businesses, and cold calls can be curated by a business development team.

Without this composed UX experience: users struggle with processing of information leads in an efficient manner. For example, management of a deal from conception to closing (signature) has traditionally been a manual process or requires usage of a variety of different applications/services at once (in a concurrent or simultaneous manner). Traditionally, this can lead to information loss, especially during transfer of information as well as lack of efficiency and execution. Moreover, many applications/services are not compatible with one another, requiring disparate communications channels that are not synchronized. Accordingly, aspects of the present disclosure are directed to addressing issues such as those noted above and/or others which may become apparent herein.

In certain more specific examples, aspects of the present disclosure are directed to systems, circuits, screens, etc., and/or methods of use, each involving a data-communications system operating with a data-communications management circuit and with a user interface (aka "UI") for providing operations related to data communications (e.g., involving media calls, chat streams, emails, messages, etc.) to and/or from targets (e.g., individuals, by endpoint devices, companies, membership group, or other designated subsets of prospective communication/call participants).

In specific examples, the present disclosure is directed to an apparatus (e.g., a system-type apparatus or a device-type apparatus such as a computer device that provides or includes a display or a field of view (FoV)) which may be in connection with a set of one or more data servers (server set) providing specified data communications services to selected individuals and/or groups of individuals as part of client entities. In such a data-communications system, such a server set may be receive and route incoming data communications (or calls as the case may be) to endpoint devices with involvement of a user interface (e.g., UI or GUI for graphic user interface) and a data communications management circuit. Incoming calls may be targeted for (or directed to) endpoint devices of associated users (prospective call participants). The user interface may be implemented by a computing processor circuit that includes a memory circuit with a directory database of contacts including identifiers of the callers and/or targeted call participants, and that operates the user interface to display certain information concurrently in respective sections of the FoV. This information may be provided via an adapted user interface that concurrently displays certain information in concurrently- or sequentially-displayed sections, thereby creating a composed user experience for user interface users (e.g., agents/receptionists). As a non-limiting example, an exemplary user interface concurrently displays a plurality of sections as indicated in Appendix 1 and/or Appendix 2 in the above-referenced U.S. Provisional Application.

As may be implemented in accordance with various embodiments, a system includes data communication server circuitry to provide data-communications services, including routing data communications on behalf of endpoint devices, and a computing processor circuit to provide a user interface (UI) that displays respective sections of a FoV (field of view). The computer processor circuit is operable with the data communication server circuitry to carry out the following for each of the endpoint devices. Operational opportunities are synchronized based on an identification associated with the endpoint device, characteristics of the operational opportunities and search characteristics input to the endpoint device. This includes accessing and synchronizing data sets generated by a plurality of applications and associated with the respective operational opportunities. The synchronized data sets may be displayed corresponding to the operational opportunities at the endpoint device, as a FoV via the UI. In response to a selection of one of the operational opportunities, data characterizing the selected operational opportunity is displayed in an interaction panel at the endpoint device. While the operational opportunities and data characterizing the selected operational opportunities are displayed, further data is generated and displayed at the endpoint device via the UI. The displayed further data is modified based on contextual aspects of user interaction with the UI and the selected operational opportunity, therein providing a dynamically changing display panel corresponding to contextual aspects of the operational opportunities and inputs received at the endpoint device.

Another embodiment is directed to a method involving providing a user interface (UI) that displays respective sections of a FoV (field of view) for each of a plurality of endpoint devices. Data sets generated by a plurality of applications and associated with respective operational opportunities are accessed and synchronized based on an identification associated with the endpoint devices, based on characteristics of the operational opportunities, and based on search characteristics input to the endpoint device. At one of the endpoint devices, the synchronized data sets corresponding to the operational opportunities and the one of the endpoint devices are displayed via the UI. In response to selection of one of the operational opportunities, data characterizing a selected operational opportunity is displayed in an interaction panel. While the operational opportunities and data characterizing the selected operational opportunities are displayed, further data is generated and displayed via the UI, including modifying the displayed further data based on contextual aspects of user interaction with the UI and the selected operational opportunity, therein providing a dynamically changing display panel corresponding to contextual aspects of the operational opportunities and inputs received at the one of the endpoint devices.

Another embodiment is directed to an apparatus comprising server circuitry to convey data with a plurality of endpoint devices, and a computing processor circuit. The computing processor circuit is cooperatively operable with the server circuitry to provide the data to each of the plurality of endpoint devices, and to facilitate communications between the endpoint devise and remote users, as follows. Data sets generated by a plurality of applications and associated with respective operational opportunities are accessed and synchronized, based on each of an identification associated with the endpoint devices, characteristics of the operational opportunities, and data input to the endpoint devices. The synchronized data sets are displayed at respective ones of the endpoint devices. In response to selection of one of the operational opportunities, data characterizing the selected operational opportunity is displayed in an interaction panel. While the operational opportunities and data characterizing the selected operational opportunity are displayed, displayed data is modified based on contextual aspects of user interaction with the UI and the selected operational opportunity, therein providing a dynamically changing display panel corresponding to contextual aspects of the operational opportunities and inputs received at the one of the endpoint devices.

Building on one or more of the above aspects, further non-limiting examples of a user interface may include additional sections that can provide further context to users of the system and/or user of the user interface including additional communication and/or status-tracking modalities (e.g., chat, messaging), and contextual data insights/suggestions for enhancing data provided in the user interface (e.g., that may be automatically generated and including real-time (including near real-time) updates based on user activity within an exemplary application/service and/or specified parameters (e.g., time window, context, client ID, project ID, sales-prospect ID, product ID).

As yet another example aspect according to the present disclosure, the user interface may enable management of a state of a certain item being tracked based on the user interface being enabled by a user automatically setting indications that the user (or a group of users) is unavailable to receive communications. In some examples, the user interface is adapted to enable users to identify parameters for which certain communications are being processed (e.g., routed or directed).

In another example, contextual information provided in association with exemplary sections of a user interface is utilized to generate call routing determinations and/or accumulation of status data corresponding to or linked to a certain parameter ID.

Functionality associated with an exemplary user interface is further enhanced by the incorporation and application of artificial intelligence that is specifically trained to execute automatic actions on behalf of a user and/or parameter ID based on contextually relevant information. In some technical instances, an artificial intelligence model may be user-specific and trained based on contextual data relevant to a specific user and further instance artificial intelligence modeling may be generated for more than one user (e.g., one or more groups of users) and/or for one or more parameter IDs. In connection with the above and other specific example embodiments, one or more other specific aspects involving the computing processor circuit may be used alone or in combination with one another as a separate feature or to build on the above-disclosed aspects of the above example embodiments. Some non-limiting examples of aspects may include the computing processor circuit being configured to: use an artificial-intelligence algorithm to train a model, wherein in response to being trained, the model is to be used for automatically filtering of certain of the contacts in the directory database, and for automatically auto-populating and/or updating directory listings in the directory database during one or more of the calls; use an artificial-intelligence algorithm to train a model, wherein in response to being trained, the model is to be used for providing real-time or near real-time contextual analytics pertaining to specific aspects displayable in the FoV, the specific aspects including one or more of: one or more menus configured on behalf of and/or specific to a client entity; and/or provide prompts to alert certain types of situations needing to be addressed or being benefited by being addressed.

In yet further examples, aspects of the present disclosure are respectively directed to systems, circuits, user interfaces having the above-characterized types of FoVs, to methods of using such systems, circuits and user interfaces having the characterized type of FoVs as in Appendix 1 and/or Appendix 2 referenced above, and to aesthetic designs in which the above-characterized type of FoV are arranged for viewing.

In yet other examples, aspects of the present disclosure (e.g., one or more of the aspects shown in a displayed FoV) can be a stand-alone app/service or can be integrated into another app/service such as 8×8 Work App (available from the instant assignee, 8×8, Inc.). The related FoV designs may be implemented to work across both desktop and/or mobile apps. For example, if a user is working on their mobile app using one of these designs, that would sync across both (as shown in some of the screenshots attached to the Account Executive and Executive Assistant documentation).

Additionally, such aspects of the present disclosure may work in connection with any of various types of systems providing unified communications (e.g., unified communications as a service, 'UCaaS'), contact center communications (e.g., contact center as a service, "CCaaS'), communications platform as a service ("CPaaS"), for example, enabling usage of application programming interfaces (APIs) and the like to customize communication stacks and integrate chosen communication channels into applications, services, websites, etc., and/or a combination thereof (e.g., providing a platform which may be referred to as XCaaS (Experience Communications as a Service)).

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIGS. 2A and 2B show a UI system for synchronizing data and communications across disparate platforms, in accordance with one or more embodiments, and in which:

FIG. 2A shows a first state with respective panels integrated to display operational opportunities and characteristics thereof, and FIG. 2B shows a second state in which the respective panels are dynamically changed based on interoperation thereof; and FIGS. 3A-3C show a mobile-based UI system, in accordance with one or more embodiments, in which:

FIG. 3A shows a first state in which data corresponding to an opportunity is presented with an incoming data communication;

FIG. 3B shows a second state in which opportunity data synchronized to the incoming data communication is accessed and displayed, and FIG. 3C shows a third state in which a recording function is enabled along with an integrated link to view and/or modify details corresponding to the opportunity data.

Figure 1A:
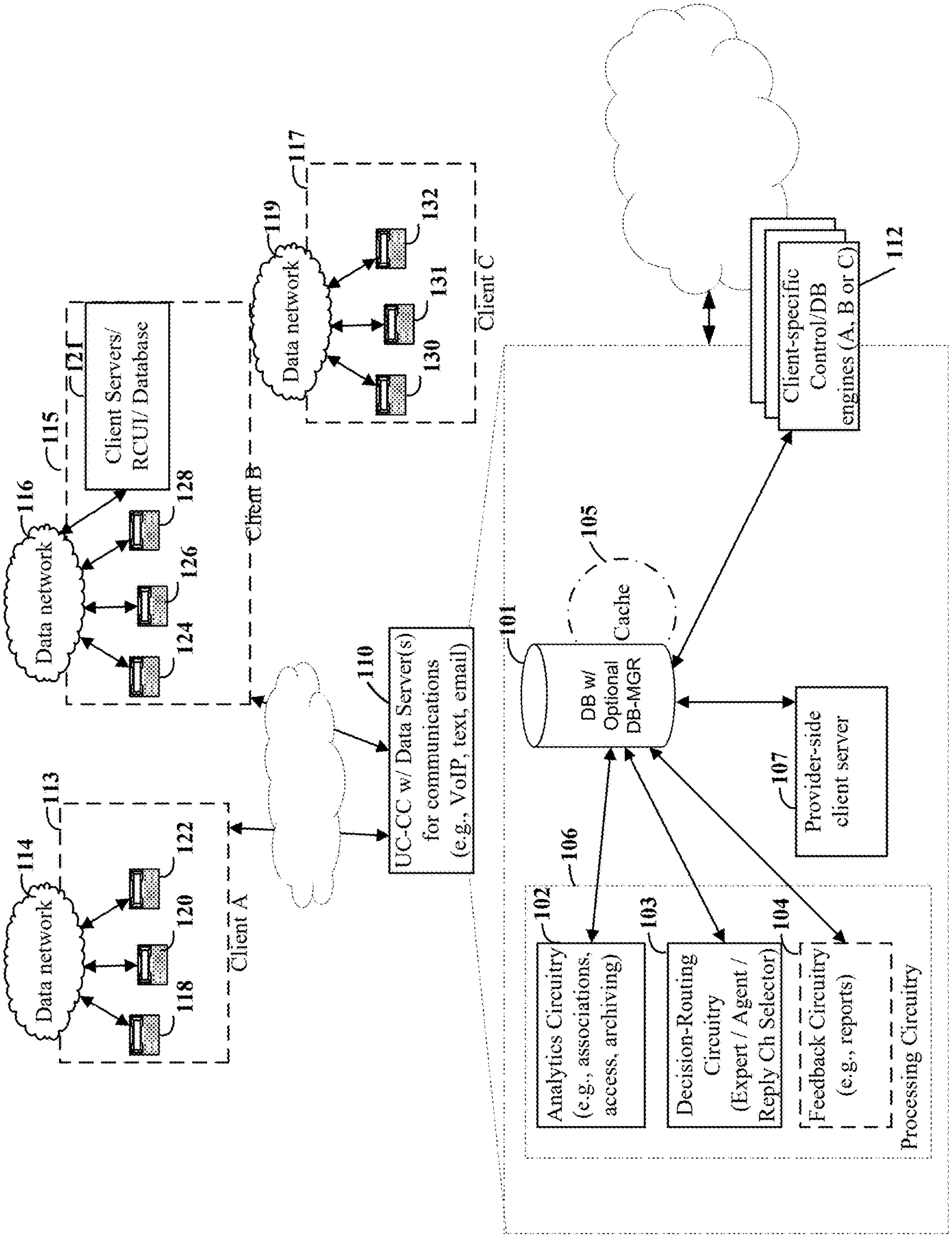
FIG. 1A illustrates an example data-communications system in block diagram form and consistent with certain examples and aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of apparatuses, systems and methods involving one or more user interfaces operable as part of or concurrently with a data communications system that provides data-communications services. As one specific example, such data-communications services may include call center services with managing and processing of incoming data communications involving a group of active and/or prospective call participants and unified communications wherein such incoming calls are readily and intelligently routed as may be provided via data communications services such as one or more of call-routing services. Other such data-communications services and/or types of media provided via such services may include one or more of the following: VoIP (voice over Internet) communications, virtual office, chat, messaging, call recording and transcription, video calls; audio calls; multi-media calls (e.g., involving audio and video); emails; and messaging (including SMS). For instance, 8×8, Inc. (the assignee of the present disclosure) provides such data communications services to individuals and/or participating entities representing groups of individuals. In certain implementations, aspects of the present disclosure have been shown to be beneficial when used in the context of a data communications system providing such services to a plurality of entities, wherein for each entity, one or more receptionists has access to a user interface with one or more of the FoV provided via an exemplary user interface according to the present disclosure (and as may be illustrated in Appendix 1 and/or Appendix 2 referenced above).

While certain specific examples discussed below may reference a particular type of system, data-communications services or media types, certain aspects of the present disclosure are not necessarily so limited. Also, as discussed herein, in various applications and contexts the user interface may be operated by any of different types of users (e.g., receptionist, leadership personnel or other user of the UI). While the disclosure may refer to one such user type (e.g., receptionist), it will be appreciated that any specifically-indicated user type may be replaced by another specifically-indicated user type (such as by substituting "leadership personnel" for "receptionist").

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As a non-limiting example, aspects of the present disclosure may work in connection with any of various types of systems providing features and functionality for UCaaS), CCaaS, CPaaS and/or a combination thereof (e.g., XCaaS), as a communications software platform for which the present disclosure may be adapted to manage, may comprise but are not limited to: contact center capabilities including workforce management (e.g., supervisory management of users such as agents, enterprise resource planning); analytics; third-party integrations software integrations including customer relationship management (CRM) tools; device management (e.g., phones including both physical phone devices and softphones, PBX, phone numbers, porting, etc.); issue management including support and help desk ticketing management; billing management; administrative management control including administrative console apps/services to enablement management of users (RBAC; profiles, desk phones; phone systems; works groups (ring groups, call queues, group paging, overhead paging, barge-monitor-whisper, music on hold, etc.); interactive voice response (IVR); call routing and distribution; omnichannel communications and integration for content management across different modalities; call recording functionality; data storage (e.g., including control over hot and cold storage); phone dialers; conversation management including messaging via chat (individual and group), SMS/MMS, including with employees, agents, conversational AI bots, etc.; machine learning and/or artificial intelligence integrations including bots such as chatbots; reporting/report generation; video conferencing and meeting management; CPaaS connectivity; website management, management of service availability; and an ML/AI platform for data integration and augmentation, among other examples.

In a specific type of example embodiment, an apparatus includes one or more data communications servers ("server set"), a computing processor circuit having a directory contacts database and a user interface, and a data-communications management circuit. The server set is to communicate or route calls initially routed by a server of a data-communications system and designated to provide data-communications services for targeted call participants. The computing processor circuit may include a memory circuit with the directory contacts database (e.g., having identifiers of the targeted call participants) and may include a user interface to display various content in a FoV of a display. In further non-limiting examples according to the present disclosure, such a user interface may include additional sections for providing further data and/or context to users including additional communication modalities (e.g., chat, messaging), and contextual data insights and/or suggestions for communication routing and/or handling (e.g., that may be automatically generated and rendered for a user) pertaining to any functionality of the present disclosure described herein including real-time (or near real-time) updates based on user activity within an exemplary application/service, among other examples.

Exemplary technical advantages as may be applicable to various embodiments described in the present disclosure may include: providing a composed UX (multiple panes in one UX view) that enables real-time (or near real-time) review of status of opportunities/deals so agents can efficiently manage deals and track status at any stage (conception to closing); providing an interactive, composed UX design that enhances processing efficiency (devices and users), delivery of information, productivity, synchronization between apps/services (including integrated channels); retrieving and providing deals/opportunities from one or more integrated channel(s) and/or disparate systems, customer relationship management database/app/services, via such a composed UX design; integrating multiple channels using disparate modalities of communications such as email, messaging, and discrete software platforms. Such aspects may be implemented to address challenges noted herein, such as those involving inefficient processing of information, incompatibilities between disparate applications/services, and processes involving information loss.

While the figures herein illustrate certain exemplary types of systems in which aspect of the present disclosure may form part, these illustrated types of systems are not necessarily limiting. For example, according to the present disclosure certain aspects are directed to an exemplary arrangement of one or more data communications servers ("server set") arranged, for instance, in a cloud-based arrangement native to the Internet. In this example context, the server set is communicatively integrated with a computing processor circuit having a directory contacts database and, for facilitating call-center-like management and/or control by a receptionist, and the server set is also communicatively integrated with a user interface and a data-communications management circuit. In one specific embodiment, the server set may include a client-entity specific server or computing processor engine, and incoming calls to the data communications system may be communicated and routed to the client-entity specific server or computing processor engine where a user interface is operated by a receptionist for processing of the calls on behalf of targeted call participants. For example, the targeted call participants may be part of the client entity for which the client-entity specific server or computing processor engine is configured to receive the services of the data-communications system (e.g., as a data-communications services subscription). The user interface may be part of call-center service which is one of many available services provided by the data-communications system, with such data-communications services including audio, chat, email and multimedia communications.

The computing processor circuit may include a memory circuit with the directory contacts database (e.g., having identifiers of the targeted call participants) and may include a user interface to display the user interface's most practical and/or convenient (e.g., most relevant and/or commonly-used) fields in respective sections of a FoV (field of view). The FoV may be a display screen of a computer circuit (e.g., a display screen of a desktop computer, of a personal user device such as an IPAD, or a mobile phone). In other implementations, the FoV may be a projected view (e.g., via 3D eyewear or a hologram, a light-transmitted projection onto a wall or other surface). Regardless of the viewing medium deployed, in specific examples and as discussed above, these sections in the FoV may correspond to that which is depicted and disclosed in connection with the screen shots (or illustrations) of Appendix 1 and Appendix 2 referenced above.

In connection with the above types of exemplary embodiments, more specific features or aspects may be used, for example, as enhancements. According one such specific aspect, an exemplary UI provides a composed visual experience that is required to meet the demands of users, and also provides efficient processing of the data communication via a communication circuit, concurrently executing therewith. In this manner, feature functionality is accessible through an adapted user interface which, from a processing standpoint, creates a composed and comprehensive user experience.

Additionally, exemplary feature functionality comprises user interface features that integrate across the different described sections of the user interface and enabling actions to be taken across different display sections, thereby truly creating a composed user experience.

Such features or aspects involving the user interface may be used alone in certain embodiments or in combination with one another as a separate feature to build on the above-disclosed aspects of the above example embodiments.

FIG. 1A illustrates one such example data-communications system in block diagram form and consistent with certain of the above-related examples and aspects of the present disclosure. As depicted, the data-communications system includes a data-communications server (or set of one or more servers) 110 configured to provide data communications services, including data communications such as VoIP calls and other types of interactions (e.g., text, chat, email, etc.), for a plurality of endpoint devices 118, 120, 122, 124, 126, 128, 130, 131 and 132 connected in one or more data networks 114, 116, 119. Using such a system, exemplary aspects of the present disclosure may be apparent from the above discussion regarding use of a unified communications platform for facilitating different types of communications services including circuitry (e.g., within at least one server 110) to process data communications to be processed and/or routed over different channels, and/or to handle selections by a receptionist (situated as noted above) for handling different types of follow-up actions depending on data and resources available to the receptionist as indicated in one or more sections in a field of view provided by a user interface configured to provide interactions between the receptionist and one or both of: status indications for user endpoint devices as active/prospective participants of the incoming calls, and resources available the data communications system. Consistent with the above discussion of exemplary embodiments, a more specific exemplary FoV may include sections such as shown in Appendix 1 and/or Appendix 2 referenced above.

In a more specific example, one feature may configurable by or on behalf of a user of the user interface (e.g., employee, administrator and/or supervisor) and/or may configurable by a computer processor running an artificial-intelligence (AI) algorithm to track and select which of different parameters are to be tracked and selected for display via the user interface (e.g., as may be limited for a certain context). The AI algorithm may use, as the certain context, a given span of time (e.g., generally or limited to certain parameter IDs as mentioned above, and/or to certain times of the day, certain periods of the week, or other calendar-specific aspects).

Alternatively, such an AI algorithm may discern (e.g., via call monitoring circuitry) a specific context regarding the incoming call before and/or while the call is being processed at the user interface. The specific context may be the given span of time as characterized above, and as an alternative to the given span of time (or in addition thereto), the specific context may be supplementary information relevant to the users of the user interface and/or to receptionists handling of the call at the call center aspect of the system (e.g., as a category with the discerned context which category is messaged or alerted to the receptionist). In this manner, example embodiments may use the AI algorithm to discern categories of individuals from indications in the contact directory and based on one or more factors associated with the incoming call/individuals, the computer processor running the AI algorithm may use a look-up table to track and select one or more features to be shown in one or a plurality of sections of the FoV. This general-information icon may become a highlighted entry in the directory section and/or may be in a separate section of the FoV and used as a suggested connection to be optionally selected by the receptionist.

In other exemplary embodiments, the computer processor running the AI algorithm may be given access to status conditions of one or more of the receptionists and/or call participants and based on a type of the call. More specifically, examples in these regards may provide the AI-enabled computer processor with information: to discern that the incoming call is in a certain call category indicated by way of the FoV-displayed directory (e.g., the call is related to sales or related to technical services or involve a customer requiring special attention); to discern from monitoring the call (e.g., via recognized trigger words and/or indication of sentiment in the call) that supervisor involvement is required; to discern from the targeted call participant that there is overload of too many calls being processed by personnel associated with the targeted call participant (e.g., a related receptionist, a department of individuals associated with the targeted call participant); and to automatically (re) configure, based on the discerned context or a status condition, one or more of the FoV sections with a particular icon or indication, so that the receptionist can more readily see and select the particular icon or indication. In certain further examples, such aspects permit the receptionist to more readily recognize that the particular icon or indication has such calls being processed in an automated manner, and the computer processor running the AI algorithm may discern a special context and based on a single UI selection or engagement by the receptionist, may cause such incoming call(s) to be automatically handled so as to avoid burdening certain personnel and/or overwhelming another FoV section.

As another particular example consistent with the above discussion of such an AI algorithm being trained and/or used to recognize certain contexts of the incoming call, the computer processor running the AI algorithm may monitor the caller identification data of the incoming call relative to designated aspects as indicated in the identified parameters as noted in Appendix 1 and/or Appendix 2 in the underlying provisional patent application to which priority is claimed. Given that the AI algorithm may automatically recognize a certain condition or a threshold (e.g., relating to a certain parameter) being reached, UI may automatically alter the FoV so as to change one of the Appendix-A characterized FoV sections (e.g., as new FoV section acting as a replacement or a supplemental section to be displayed).

As may be implemented in accordance with various embodiments, a communications system includes data communication server circuitry to provide data-communications services, including routing data communications on behalf of endpoint devices, and a computing processor circuit to provide a user interface (UI) that displays respective sections of a FoV (field of view). The computer processor circuit is operable with the data communication server circuitry to carry out the following, for each of the respective endpoint devices (and as may be tailored to each endpoint device). Operational opportunities are synchronized based on each of: an identification associated with the endpoint device, characteristics of the operational opportunities, and search characteristics input to the endpoint device. This includes accessing and synchronizing data sets generated by a plurality of applications and associated with the respective operational opportunities. The synchronized data sets may be displayed corresponding to the operational opportunities at the endpoint device, as a FoV via the UI. In response to a selection of one of the operational opportunities, data characterizing the selected operational opportunity is displayed in an interaction panel at the endpoint device. While the operational opportunities and data characterizing the selected operational opportunities are displayed, further data is generated and displayed at the endpoint device via the UI. The displayed further data is modified based on contextual aspects of user interaction with the UI and the selected operational opportunity, therein providing a dynamically changing display panel corresponding to contextual aspects of the operational opportunities and inputs received at the endpoint device.

Accordingly, the computer processor circuit may interact with other applications (internal or external) to retrieve, synchronize and display opportunities. Multiple disparate communication modalities may be facilitated, for interacting with different remote users in accordance with user-specific communication types. Such communications may be generated within a common portion of a UI at a particular endpoint device. In addition, communications on such channels may be filtered to ensure that security characteristics are followed, as described herein.

In various contexts, operational opportunities refer to sets of data that may identify people, companies, and operations to be performed on behalf of the people and/or companies, such as for establishing and/or utilizing communication channels, certain UI configurations, or analytics. The sets of data may also be used to set up communication channels in an opportunities panel of a UI. For instance, voice, video, and other types of communications may be tied to a specific opportunity. Further, such aspects may be internal (e.g., team) or external (e.g., customer) type contacts.

Various aspects of the aforementioned system may utilizing machine learning and/or artificial intelligence, in a variety of manners. For instance, displays may be curated based on contextual aspects. In a particular embodiment, the computing processor circuit operates to assess contextual aspects of user interaction with the UI and the selected operational opportunity, for multiple different users and different operational opportunities. The computing processor circuit may modify the displayed further data for the selected operational opportunity based on the assessed contextual aspects.

In another embodiment, opportunities are prioritized based on machine learning and assessment of contextual factors. For instance, such contextual factors may be associated with an opportunity, such as customer data, date, length/history of communications, personnel involved, priority indication, and state of an offer (e.g., proposal, demo, order, signature deployment).

The computing processor circuit may operate in a variety of manners. In some implementations, the computing processor circuit establishes one or more communication channels between a particular endpoint device and an end user corresponding to a selected operational opportunity. Data from the data communication server circuitry that characterizes the communication channel is displayed. Such a communication channel may be selected based on the contextual aspects of the user interaction. For instance, context pertaining to a type of communication or conversation may be utilized to select a relevant communication channel, such as by selecting a short message (e.g., text message) for simple communications, or by selecting email for more complex communications and/or communications involving attachments. In some implementations, multiple communication channels may be utilized, for example by providing a document in a shared workspace while also sending a text to alert a recipient of the availability of the document. As another example, data provided by a user in an input panel may be communicated to one or more remote endpoint devices via a plurality of disparate communication modalities, such as messaging, calls, email, and chat rooms.

Multiple operational opportunities may be assessed, and a priority level may be assigned to respective ones thereof based ion the assessment. The synchronized data sets corresponding to the operational opportunities may be displayed at the endpoint device based on the assigned priority level and characteristics of the endpoint device.

Certain aspects are directed to providing a secure gateway that allows data to be accessed from multiple applications. For instance, third party remote applications may be operated for different clients and/or different internal clients with secure data. Data may be secured, for example by maintaining certain proprietary data for a particular entity/user separate from another entity/user. The computing processor circuit may thus include a secure gateway to, for respective ones of the operational opportunities synchronized to the endpoint device, filter data communicated from the data communication server circuitry in accordance with each respective one of the operational opportunities, based on security characteristics associated with the communicated data. In certain embodiments, communications channel options may be filtered based upon a destined recipient of the communications and a security characteristic associated with the destination, and additional data corresponding to these aspects may be displayed.

Operational opportunities may be synchronized in a variety of manners. In some implementations, the computing processor circuit interacts with a plurality of applications to retrieve, synchronize and display characteristics of sets of data. This may include data that identifies people, companies, operations to be performed, and data for establishing communication channels with the identified people and companies. Further, data corresponding to operational opportunities may be reassigned from one of the endpoint devices to another of the endpoint devices in response to changes in characteristics of the operational opportunities and characteristics of the endpoint devices.

Data characterizing selected operational opportunities may be displayed in an interaction panel at an endpoint device so that data characterizing interactions specific to the selected opportunity is provided. If the operational opportunity is de-selected, the interactions specific to the selected opportunity are no longer displayed.

Another embodiment is directed to a method involving the provision of a UI that displays respective sections of a FoV for each of a plurality of endpoint devices. Data sets generated by a plurality of applications, and associated with respective operational opportunities, are accessed and synchronized based on each of: an identification associated with the endpoint devices, characteristics of the operational opportunities, and search characteristics input to the endpoint device. For instance, this may involve accessing data from disparate applications that may otherwise not interact with one another, and displaying that data together in a collective format, with the data being synchronized, for example to a common opportunity. In addition, one or more communication channels may be established between the endpoint device and an end user corresponding to the selected operational opportunity. Further, data characterizing the at least one communication channel may be displayed.

At one of the endpoint devices, the synchronized data sets that correspond to the operational opportunities and the endpoint device are displayed via the UI. In response to selection of one of the operational opportunities, data characterizing the selected operational opportunity is displayed in an interaction panel. This may involve, for example, displaying users associated with the operational opportunity and one or more communications/communications channels that may be utilized therewith.

While the operational opportunities and data characterizing the selected operational opportunities are displayed, further data is generated and displayed via the UI. The further data as displayed is modified based on contextual aspects of user interaction with the UI and the selected operational opportunity. This approach provides a dynamically changing display panel corresponding to contextual aspects of the operational opportunities and inputs received at the one of the endpoint devices. For instance, where a user interacts to assess and/or provide priority data associated with respective operational opportunities, such data can be utilized to rank the respective opportunities.

In some implementations, contextual aspects of user interaction with the UI and the selected operational opportunity are assessed for multiple different users and different operational opportunities. The displayed data for the selected operational opportunity may be modified based on the assessed contextual aspects. Such approaches may involve machine learning, utilizing the assessed contextual aspects to improve the manner in which interactions are facilitated and/or in which information is displayed.

Multiple operational opportunities may be assessed for assigning a priority level to respective ones of the operational opportunities. The synchronized data sets corresponding to the operational opportunities may be displayed at the endpoint device based on the assigned priority level and characteristics of the endpoint device.

For respective ones of the operational opportunities synchronized to the endpoint device, data communicated in accordance with each respective one of the operational opportunities may be filtered based on security characteristics associated with the communicated data. For instance, as discussed herein, certain data may be restricted from external participants.

Another embodiment is directed to an apparatus comprising server circuitry to convey data with a plurality of endpoint devices, and a computing processor circuit. The computing processor circuit is cooperatively operable with the server circuitry to provide the data to each of the plurality of endpoint devices, and to facilitate communications between the endpoint devise and remote users, as follows. Data sets generated by a plurality of applications and associated with respective operational opportunities are accessed and synchronized, based on each of: an identification associated with the endpoint devices, characteristics of the operational opportunities, and data input to the endpoint devices. The synchronized data sets are displayed at respective ones of the endpoint devices. In response to selection of one of the operational opportunities, data characterizing the selected operational opportunity is displayed in an interaction panel. While the operational opportunities and data characterizing the selected operational opportunity are displayed, displayed data is modified based on contextual aspects of user interaction with the UI and the selected operational opportunity, therein providing a dynamically changing display panel corresponding to contextual aspects of the operational opportunities and inputs received at the one of the endpoint devices.

The computing processor circuit may operate in a variety of manners. In some implementations, the computing processor circuit operates to establish at one or more communication channels between the endpoint device and an end user corresponding to the selected operational opportunity. Data, from the data communication server circuitry, characterizing the at least one communication channel may be displayed. For instance, where a particular end user may receive communications via multiple channels, data input to a common aspect of the UI may be transmitted using any of the communication channels.

The computing processor circuit may operate to select the communication channel based on the contextual aspects of the user interaction, and to filter communications channel options based upon a destined recipient of the communications and a security characteristic associated with the destination. Using this approach, disparate channel-based security control may be provided for respective recipients. For instance, data may be assigned security levels, and transmission of data at a particular security level may be prohibited for certain channels.

In other implementations, the computing processor circuit may assess contextual aspects of user interaction with operational opportunities over time, for multiple different users and different operational opportunities. This may involve a machine learning type approach, for instance to identify successful interactions and utilize characteristics thereof. The displayed data for subsequently-selected operational opportunities may be modified accordingly, based on the assessed contextual aspects.

As may be consistent with the above, aspects of the present disclosure are directed to systems and methods that implement trained AI processing to further contemplate other types of signal data that may be collected through various host applications/services (e.g., pertaining to a software platform). For instance, application of trained AI processing (e.g., one or more trained machine learning models may be adapted to evaluate not only data and data sources integrating with an exemplary UX for assessing and serving operational opportunities, but other types of contextual data including past and/or current user actions, user preferences, application/service log data, etc., that are each associated with one or more users, entities, systems and/or endpoint devices. This additional signal data analysis may help yield determinations as to how (and/or when) to generate updated analytics (in real-time or near real-time) and/or reporting, as well as when and how often to present data insights and/or suggestions.

Non-limiting examples of signal data that may be collected and analyzed includes but is not limited to: device-specific signal data collected from operation of one or more user computing devices; user-specific signal data collected from specific tenants/user-accounts with respect to access to any of: devices, login to a distributed software platform, applications, services, etc.; application-specific data collected from usage of applications/services and associated endpoints (including third-party endpoints integrated within a software platform), data collected from disparate software platforms that provide disparate types of operational opportunities; or a combination thereof. Analysis of such types of signal data in an aggregate manner may be useful in helping generate contextually relevant determinations, data insights, etc. Analysis of exemplary signal data may comprise identifying correlations and relationships between different types of signal data specific to user usage of one or more software data platforms (e.g., communications software platforms), where telemetric analysis may be applied to generate determinations with respect to a contextual state of user activity with respect to different host application/services and associated endpoints. Analyzing of signal data, including user-specific signal data, may occur in compliance with user privacy regulations and policies.

In some examples, one or more components are configured to manage application of one or more AI models to enhance processing described in the present disclosure. Trained AI processing is applicable to aid any type of determinative or predictive processing including specific processing operations described with respect to determinations, classification ranking/scoring and relevance ranking/scoring. An exemplary component for implementation trained AI processing may manage AI modeling including the creation, training, application, and updating of AI modeling. Trained AI processing may be adapted to execute specific determinations described herein including those for analyzing specific data and data sources of a software data platform (e.g., a communications software platform) and/or generating insights for data augmentation. For instance, an AI model may be specifically trained and adapted for execution of processing operations pertaining to analyzing features and functionality of an XCaaS offering including those non-limiting examples previously described. Non-limiting examples of AI implementation including but are not limited to: analyzing data (and metadata) associated with one or more software platforms including third-party integrations; generating contextual determinations for improving user experience, access to opportunities across disparate platforms (and for example rating or ranking such opportunities), performance, efficiency including contextual determinations for improving account access with respect to servicing opportunities, suggesting utilization of certain opportunities, and/or integrations including third-party integrations to enhance access; prioritization of opportunities, actions, etc. to improve workflow and processing. Exemplary AI processing may be applicable to aid any type of determinative or predictive processing by any components of the present disclosure, via any of: learning for curating displays, learning for prioritizing opportunities, and learning for manners in which to assess and/or present respective opportunities, among other examples. In one example, trained AI processing comprises a hybrid AI model (e.g., hybrid machine learning model) that is adapted and trained to execute a plurality of processing operations described in the present disclosure. In alternative examples, trained AI processing comprises a collective application of a plurality of trained AI models (e.g., 3 trained AI models) that are separately trained and managed to execute processing described herein. In alternative examples, the present disclosure extends to integrating third-party AI modeling and further adapting and customizing said AI modeling to work with specific data and data sources of an exemplary software platform. For example, a third-party AI model may be adapted to work with a communications software platform including data, data sources, and integrations (e.g., APIs, web hooks, etc.) related to XCaaS features and functionality. In examples where a plurality of independently trained and managed AI models is implemented, downstream processing efficiency may be improved by an ordered application of trained AI models where processing results from earlier applied AI models can be propagated to subsequently applied AI models. For example, a trained AI model may evaluate opportunities and derive data correlations to improve processing and efficiency including suggestions for reallocation of resources and/or prioritizing of opportunities, which may then be utilized to suggest a re-prioritization of opportunities (and/or reallocation of resources as may be appropriate) to improve efficiency and quality of services provided.

Non-limiting examples of supervised learning that may be applied comprise but are not limited to: nearest neighbor processing; naive bayes classification processing; decision trees; linear regression; support vector machines (SVM) neural networks (e.g., convolutional neural network (CNN) or recurrent neural network (RNN)); and transformers, among other examples. Non-limiting examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting examples of semi-supervised learning that may be applied comprise but are not limited to: assumption determination processing; generative modeling; low-density separation processing and graph-based method processing, among other examples. Non-limiting examples of reinforcement learning that may be applied comprise but are not limited to: value-based processing; policy-based processing; and model-based processing, among other examples. Furthermore, a component for implementation of trained AI processing may be configured to apply a ranker to generate relevance scoring to assist with any processing determinations with respect to any relevance analysis, such as that described herein. Scoring for relevance (or importance) ranking may be based on individual relevance scoring metrics described herein or an aggregation of said scoring metrics. In some examples where multiple relevance scoring metrics are utilized, a weighting may be applied that prioritizes one relevance scoring metric over another depending on the signal data collected and the specific determination being generated. Results of a relevance analysis may be finalized according to developer specifications. This may comprise a threshold analysis of results, where a threshold relevance score may be comparatively evaluated with one or more relevance scoring metrics generated from application of trained AI processing.

Referring to FIG. 1A in connection with more specific system-level example embodiments which may be used with the present disclosure, a data-communications server 110 may include an arrangement of coordinated servers such as one or more VOIP communications servers that provide VoIP communications and one or more other types of communications servers that provide such other forms of data communications service(s). Although FIG. 1A illustrates two data networks 114, 116 communicatively coupled to the data-communications server 110, examples are not so limited and the data-communications server 110 can be communicatively coupled to three or more data networks, including as examples but not limited to broadband networks such as the Internet, cellular-telephony and/or satellite communications networks, etc. Such networks and communicatively-coupled endpoint devices are configured to communicate with one another (directly and/or indirectly) using data-communications circuits which are typically wireless transceivers with user interfaces (graphic user interfaces, audible, etc.). For purposes of facilitating discussion, various specific embodiments are herein directed to methods and apparatuses that include the data-communications server 110 and processing circuitry 106 in one or more of the above-noted variety of forms. Although the processing circuitry 106 is illustrated as a component of the data-communications server 110, embodiments are not so limited and the processing circuitry can form part of or be separate from the data-communications server 110.

In such contexts, exemplary aspects may also involve data-communications apparatuses, such as servers and user-operable endpoint devices capable of communicating over a broadband network (e.g., Internet, other private and/or public network) with a plurality of remotely-located data-communications circuits respectively associated with a plurality of remotely-situated client entities. The servers may be arranged as a unified-communications platform ("UC-CC platform") which includes one or more UIs for providing call-center actions by receptionists as described above. The UC-CC platform, in this type of system, is integrated with a memory circuit including a database of information sets, and processes incoming data-communication interactions including different types of digitally-represented communications. Among such communications may be an incoming communication or call (e.g., "interaction"). Each of the information sets includes experience data corresponding to past incoming data-communication interactions processed by the platform, and with aggregated and organized data based on data collected in previous incoming interactions. The platform accesses the database and may: use past interactions and other data sources; and the receptionist-operable UI is to facilitate an automated self-service experience for users by resolving inquiries discerned through the incoming interactions; and/or effecting call-decision routing of incoming interactions to call-center agents or specialists.

The memory circuit may include a database, such as 101 in FIG. 1A or a separate memory circuit, having a plurality of information sets. As examples, each of the information sets may include user/client-entity contact information and/or experience data corresponding to past incoming data-communication interactions processed by the platform, and with the information sets being populated via an aggregation of organized data based on data collected in previous incoming interactions. The platform regularly accesses the database to assess the incoming interactions and may use past incoming interactions along with information collected via other data sources (e.g., internal to the system such as AI/ML modeled data and/or third-party information). By analyzing the incoming interactions and accessing possible associations relative to the information sets in the memory circuit 101, the platform is able to help the user of the UI (e.g., receptionist or other user) by optimizing the FOV section(s) as described above.

Further, the AI model may be trained to automatically filter the directory based on contextual cues discerned from the computer processing circuit in real time or otherwise. As an example, one such related feature is to auto-populate and update directory listings while there are active calls. For instance, a receptionist or user of the UI may consistently route calls to a specific person/group, where the directory listing can be automatically updated in real-time (view-wise) to put that person at the top of list so that personnel do not have to spend time going through directory. This reduces latency and improves efficiency. Another example is where the computer processing circuit is monitoring calls for keywords (or emotions as may be discerned from audio or digital voice data) that can be used to automatically update directory with certain historical comments (e.g., VIP, special expertise, technical person, sales-type person, difficult person to deal with, etc.). When implementing this feature, the computer processing circuit may control, in view of privacy/regulatory issues, what information may be linked with the person in the directory (e.g., by permitting the receptionist to view and select a menu of selectable options based on the discerned contextual cues).

Such analytics (e.g., as provided by such an AI algorithm) may be incorporated in real-time to help provide suggestions to receptionists at such a UI on how to handle certain possibly difficult situations/issues. Specific examples include: given the recognized context/issues involving this particular or type of call, there is a likelihood that the call should be transferred to a certain person or department (with the likelihood being X % of the time); user-specific analytics with past alerts that this particular caller has a special status requiring special handling (e.g., transfer to a supervisor, using calming words so as not to escalate the caller, etc.); and this particular caller and/or user was on hold for 10 minutes previously (or had filed a complaint previously) so expedite processing of this call.

As other example aspects according to the present disclosure, results of trained AI processing can be used to provide the UI with specific data and/or context for automatic data insight notifications to aid with the user's processing of the incoming and pending calls. Such notifications surfacing can be automatic notifications to the user interface FoV for providing immediate data insights. Examples include: automatic updates of UI menus such as directory/registry; automatic prioritization of held calls (e.g., based on priority, time on hold, etc.); and automatic suggestions for call routing (persons/departments) including automatic UX messages accompanying the same.

The user endpoint devices are circuit-based instruments that may be used by personnel (or users) and include data communications-enabled circuitry, such as VOIP-enabled endpoint devices (e.g., IP phones, smart phones, tablets, and/or desktop computers with appropriate VoIP software applications) and/or non-data communication/VoIP enabled endpoint devices (e.g., plain old telephone service (POTS) telephones and cellular-capable devices). Each endpoint device may be respectively associated with an account of a respective client. The endpoint devices can be associated with a particular client account by registering the endpoint device with a particular client account serviced by the data-communications server 110. Registered devices for each client account can be listed in a respective account settings file (not shown) stored by the data-communications server 110. In this example, endpoint devices 118, 120, and 122 are associated with an account 113 for a first client A and endpoint devices 124, 126, 128 are associated with an account 115 for a second client B (and similarly endpoint devices 130, 131 and 132 for client C). In such a manner, a plurality of endpoint devices can each be serviced by the data-communications server 110 in accordance with aspects of the present disclosure. One or more of the clients can have client servers and/or databases 121 which are used to implement a variety of different services.

Accordingly, the endpoint devices are data-communications circuits which may be remotely located relative to the data-communications server 110 and may be respectively associated with remotely-situated client entities. In certain but not all embodiments, the data-communications system may include the remotely-located data-communications circuits such as the client station. In some instances one or more of the endpoint devices corresponds to and/or includes a computer or a smartphone (e.g., mobile phone or tablet) that functions as a softphone by running application software; and/or a computer or a smartphone to operate natively within a web browser (e.g., using webRTC) and in turn the web browser is to run on such a computer or a smartphone.

The system may include one or more processing circuits configured to implement client-specific engines or servers (e.g., computer processing circuitry and/or servers configured specifically for one or more specific client entities), which are configured to adjust the data-communications provided for the associate client account(s) according to a respective set of control directives. The client-specific control engine can be part of the server set at 110 as in FIG. 1A, and/or such client-specific engines or servers may be respectively co-located at or near respective facilities of the associated client entities (e.g., Client A at 113, Client B at 115 and Client C at 117). In each such example, the above-characterized UI is configured as part of the client-specific control engine. The client-specific engines or servers may be used to adjust routing of an incoming interaction (e.g., a VoIP-type data or text communication) to or from an endpoint device associated with a client account. As further examples, incoming calls to the client may be processed by the user viewing the FoV (e.g., a receptionist) and the UI efficiently and intelligently routing the calls to appropriate agents of the client, and this processing may be optimized for the UI so as to have a manageable and organized perceptive view of the various FOV sections.

Accordingly, such a UI with the different FoV sections being concurrently displayed and accessible to the receptionist can permit the receptionist to manage and process calls on behalf of the related client account as needed to optimize serving calls involving the client.

In certain more specific system-related embodiments with the client-specific engines or servers implemented in various locations as discussed above, the respective UIs can be implemented through a central system server (such as at 110 of FIG. 1A). Additionally or alternatively, one or more client-specific engines or servers can be implemented by one or more processing circuits maintained by the client including, for example, database circuit 101 which may include a database manager with configurable memory circuitry including security-controlled access and filtering functions (e.g., call-blocking and/or automatic call routing based on client/user profiles and/or AI-provided data or feedback). Similarly, the control directives can be stored locally within the client-specific control engines, or stored remotely (e.g., in a centralized database, in a database maintained by the client entity, or a combination thereof). In certain specific examples, the database manager (and/or database 101) refers to or includes a relational database management system (RDMS) which stores data securely and returns the data in response to requests from other applications, as implemented by a database management server, and which can temporarily store data in cache memory 105 for fast access by the server at 110.

In other specific examples and consistent with the above examples in which the computer processing circuit runs an AI algorithm, the present disclosure is directed to a call center UI-based automated or semi-automated self-service to aid call-center receptionists in providing callers a positive experience. In these examples, the data-communications server 110 of FIG. 1A may coordinate with the processing circuitry 106 and various related circuits (e.g., servers, software-directed aspects of CPU(s), logic circuitries, etc.) so that analytics circuitry 102 can analyze an incoming call (or interaction) relative to content in the database 101 and/or relative to AI algorithm models used by analytics circuitry 102. The AI algorithm models may be integrated with or otherwise have access to decision-routing circuitry 103 for deciding whether and/or how an incoming interaction should be routed, and in certain more specific examples or applications also having feedback circuitry 104. In specific embodiments, the data-communications server 110 may use the analytics circuitry 102 to analyze an incoming interaction by capturing and analyzing digital voice data from spoken conversations in connection with incoming interactions such as between agents of a client entity and customers. This AI-discerned information may be used to suggest to the receptionist how to best process the call. The spoken conversations being transcribed from audio to digital voice data by the data-communications server 110, the computer processing circuit may use the UI to provide and access relevant aspects of the transcribed audio for use by the receptionist who may be attempting to process the incoming call.

The transcription of the spoken audio words to digital voice data can occur via a variety of methods. By discerning the contact information and/or other content (e.g., context of call and/or the transcription), the decision-routing circuitry 103 of FIG. 1A can access the information sets to check for associations and, if certain associations relevant to the current (e.g., live) call are detected, the call may be routed as indicated by an associated one of the information sets, by user/client-entity profile settings stored with or linked to the associated one of the information sets, and/or based on a metric indicating sufficient confidence that the routing the call to a specific designation is appropriate (e.g., to an expert such as a specialist having been training or otherwise having special knowledge regarding topic discerned from the call, or to an agent/manager who is assigned to the topic or incoming interaction), and each such decision may be discerned by accessing and analyzing the information sets. For more general and specific teachings on transcribing audio to test, reference may be made to U.S. Publication No. 2009/0276215, filed on Apr. 17, 2007, entitled "Methods and Systems for Correcting Transcribed Audio Files;" U.S. Pat. No. 7,236,932, filed Sep. 12, 2000, entitled "Method of and Apparatus for Improving Productivity of Human Reviewers of Automatically Transcribed Documents by Media Conversion Systems;" and U.S. Pat. No. 6,424,935, filed Jul. 31, 2000, entitled "Two-way Speech Recognition and Dialect System," each of which are fully incorporated by reference in their entirety for their general teachings and for their teachings in this specific regard. For more general and specific teachings on use of analytics (e.g., AI) circuitry and/or aspects regarding such a UC-CC platform, transcribing audio to test, reference may be made to PCT Application No. PCT/US2021/048238, file Aug. 30, 2021, entitled "Communications Apparatus Using Channel Communications Management". Each of the above-identified patent documents is incorporated by reference in its entirety generally and for the specific aspects noted hereinabove.

In such examples (and as may be implemented with a variety of embodiments herein), computing processor circuitry may also be configured to use an AI algorithm to train an AI model (sometimes referred as AI and/or machine learning), wherein in response to being trained, the model is to be used for automatically performing certain functions or activities on behalf of a client entity. For example, client entities may have respective client-specific engines or servers 112 of FIG. 1A (or similar) co-located with or otherwise serving respective Clients A, B and C, with each being integrated with AI-enabled computer processor circuitry. Alternatively and as may be convenient for smaller client entities without a co-located client-specific server, the system may have the computing processor circuitry (and UI and/or management circuitry) that is cloud based or integrated in a provider-side client server 107 which is to serve (but treat separately) multiple individual clients as though they did have their own respective client-specific servers. Hence, the functionality makes it appear that each client has a dedicated server, despite multiple clients accessing the server 107. The AI-enabled computer processor circuitry may be integrated along with the UI and data-communications management circuitry, which may be separate from or distributed in each such client-specific server, and in the server 110. In these and other example configurations, AI model training may involve automatically auto-populating and/or updating directory listings in the directory database during one or more calls, and filtering of certain contacts in a directory database in response to a receptionist selecting certain sections of the user interface (e.g., the UI). In response to being trained, the AI model may be used by the computer processing circuitry for providing real-time or near real-time contextual analytics pertaining to specific aspects displayable in the FoV, and with the contextual analytics being used to prompt the receptionists via a configurable entry or section of the UI's FoV. Further, such prompting may lead the receptionist to select an aspect as displayed on the FoV to automate a certain feature (e.g., certain playback audio specifically related to a discerned one of the contexts) and/or to access additional information that is relevant to the incoming call for possible additional selection by the receptionist. In this context, for example, the computer processing circuitry may prompt the receptionist to select one or more menus (e.g., as a subcategory the directory) for directing certain incoming calls (e.g., to an expert or specialist), or for directing certain incoming calls of certain customers to specific contacts as indicated by links in the directory database, and to a supervisor in the event of a possible problems concerning an emotion (or trigger word or intonation) relating to a perceived or actual ability of an agent to process the incoming call(s) as may be needed for a positive caller experience. As properly trained from previous interactions and/or client-specific customization, the AI algorithm may also be trained so that the model is to be used for providing automatic notifications to/from the receptionist via the UI, wherein the automatic notifications include suggested actions for assistance concerning one or more of the calls. In one specific example, an automatic notification is used to prompt the user via the UI to select specific or additional computing resources as needed to run contact center operations given the rate of incoming calls.

Figure 1B:
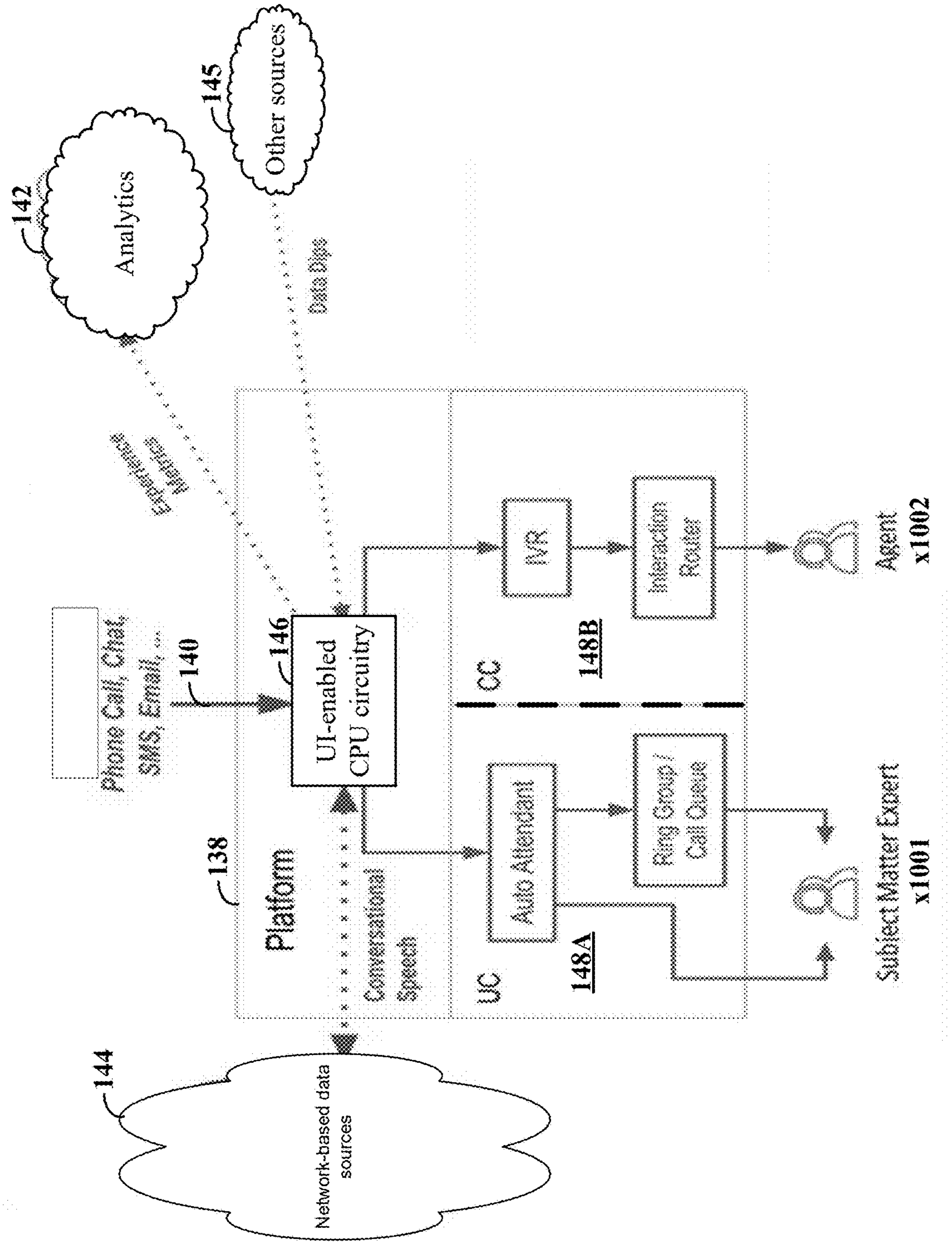
FIG. 1B shows a system and related approaches for providing a UI with an optimized set of FoV sections to facilitate interaction with operational opportunities, as may be implemented in accordance with one or more aspects of the disclosure.

Another form of an example data-communications system is shown in FIG. 1B, which bears similar aspects as the system depicted in FIG. 1A and which also uses a receptionist via a UI with an optimized set of FoV sections to help the receptionist process incoming calls received by the system's data-communications server (representing one or more servers) 138. The incoming calls may be, for example, in the form of VOIP calls, chat, SMS, email and other types of communications. The data-communications server 138 in this example is configured as a unified-communications and call center (UC-CC) platform, and which may receive different types of communications via one or more different types of channels (e.g., typically over the Internet. The system of FIG. 1B may also be configured for processing incoming interactions associated with the server 138 processing conversational speech (e.g., by monitoring, recording, transcribing and analyzing) and with other data sources via connections to other circuit-communicative endpoints through a broadband network (e.g., Cloud-based) as depicted at network 144.

An analytics (CPU) processor circuit 142 and other database/source circuitries (e.g., accessible through the network 144 and in some examples others) may be integrated with the server 138 but separated by pathways via one or more broadband connections. The analytics processor circuit 142 may be used in a manner corresponding to the analytics circuitry 102 as discussed with FIG. 1A. Alternatively, the server 138 may have the analytics circuitry internal to the platform (not shown in FIG. 1B) and/or the analytics processor circuit 142 may be used selectively by the server 138 to complement the data and associations of the information sets stored in the analytics circuitry internal to the server 138. In another example, the analytics block 142 in FIG. 1B is a software analytics package that is downloaded (optionally with an AI algorithm) for use and execution via computer processing circuitry (and/or a server) of a client entity.

The other database/source circuitries 145 permit the server 138 to be connected to other sources of information including, as examples, AI/ML resource services which may be trained via data fed by the server 138, customer systems, and third-party servers (e.g., Lexis and Westlaw (online research), Salesforce™, Microsoft Dynamics, and other applications for business, research, etc.).

The server 138, as shown with conceptual (not physical separation of) responsibilities and tasks at 148A and 148B, processes each of these different types of interactions via an integrated memory (e.g., the database circuit 101 of FIG. 1A) for access to information sets which may have user/client-entity contact information and/or experience data corresponding to past incoming data-communication interactions processed by the UC-CC platform. The server platform receives and initially processes an incoming interaction via channel 140 so that an initial step of analysis may be performed. This initial analysis step, which again may be performed conceptually on one or both the UC and CC sides, may involve, for example, security authorization, gate-way passing and/or handing off the incoming interaction to another module within the server or outside the server for further analysis such as the analytics processor circuit 142. Importantly for personalization and client-specific customization, the initial analysis step may also involve oversight and control by authorized personnel having access to the above-characterized UI.

In one specific example implementation, the server (or "server platform") 138 includes a UI-enabled computer processing circuit 146 which includes a data-communications management circuit and a UI as described in connection with one or more of the above examples. The UI-enabled computer processing circuit 146 is operable on behalf of at least one specific client and is configured to permit callers (on one or more of the channels types at 140) to benefit from an apparent self-service experience which may involve a silent (seemingly transparent) receptionist via the above-disclosed FoV sections. Via a customized one of the several FoV sections, the receptionist can enable certain individual calls, groupings of calls, and/or types of calls to be automatically processed (routed to a subject matter expert, a desired agent, or automated recording with requested information) with the customized one of the FoV sections indicating when and which calls have been routed to designated call participants via the automation, and further indicating, via monitoring of the call (e.g., via feedback from the designated call participants at the close of the call and/or one or more of the circuits in processor circuitry 106 of FIG. 1A) whether the automatically-processed call provided a successful user experience, for example, from the perspective of the individual who initiated the call.

The vertical dashed line in the server platform 138 is used to show separation of responsibilities of the server conceptualized via UC side 148A and CC side 148B of the server platform; however, in certain example embodiments of the instant disclosure these UC-side and CC-side responsibilities may be actually implemented via physical/logical integration in various ways including the following specific examples performed by the platform/processing circuit to provide an integrated secure-access environment and being performed as only one or a combination of one or more of the following actions, each of which may be overseen and interrupted by the receptionists using a section of the sectionalized UI as in the above examples (including those exemplified in the figures of Appendix 1 and/or Appendix 2 as referenced above). First, a high-level security-based firewall circuit may be implemented (which may be integrated with the database manager) for accessing one or more of the circuitries 101 (FIG. 1A), 142 and/or 144 with secondary/tertiary level checks before granting accesses. Second, access to one or more of the circuitries 101, 142 and/or 144 may be granted with the access pathway implemented as an internal bussing structure controlled by a database manager internal to the UC-CC platform, so as to control access requests to or from the platform. Third, such accesses may be granted while prohibiting traversal of any broadband gateway circuit and/or of any security-based firewall circuit. Fourth, such accesses may be granted so long as data provided from one or more of the circuitries 101, 142 and/or 144 occurs via a single access-based request-and-receive-data transaction, for example, a "single dip" transaction, involving only one of the circuitries 101, 142 and/or 144. Fifth, there is a limited number of such access-based request-and-receive-data transactions, for example, a "double dip" involving two transactions to any one of the circuitries and/or involving two transactions to two of the circuitries 101, 142 and/or 144 (or alternatively, a "triple dip" involving three transactions collectively to two or to three of the circuitries 101, 142 and/or 144). Sixth, such accesses may be granted while prohibiting (or exclusively permitting certain types of) data from being provided over any or one or more particular broadband networks, any or one or more particular gateways, and/or any or one or more particular security-based firewall circuits. Again, two or more of the above examples may be used in combination, for example, with the sixth example being used with fourth or fifth example.

Next, the incoming interaction may be processed by circuit-based modules which traditionally are more closely associated with only one of the UC and CC sides. For example, as depicted in FIG. 1B at the UC side, activities may involve functionality involving personalized involvement by the receptionist at the UI, wherein the receptionist causes the call to be processed via auto-attendant operations/recordings, and/or ring-group/call-queue operations to permit incoming callers to access experts/specialists (e.g., a subject matter expert) having specialized knowledge concerning the nature, purpose or context of the incoming interaction as discerned by the analytics processing of the incoming interaction and/or as indicated by answers from the initiator (e.g., caller) of the incoming transaction to automated subject-based hierarchical queries from the server back to the initiator. The server/processing circuit may route such a particular incoming interaction to a discerned one of various possible selected experts (or specialists) having a high likelihood of being able to address the issue of the incoming transaction. In more specific example embodiments, the server/processing circuit may decide at which point to route the incoming transaction to such an expert or specialist (via real or virtual system extension x1001) based on a confidence level, relative to a fixed or variable threshold, that the discerned issue is likely corresponding to a knowledge category or categories linked to the expert or specialist. Moreover, the threshold and/or the manner in which the issue is discerned may be based on the server/processing circuit assessing data from, as examples: information set(s) accessed in the database (e.g., 101 of FIG. 1A); and analytics circuitries/modules (which may or may not include AI/ML models), whether internal to the data-communications system and/or external via a broadband and gateway to/from the system (e.g., via analytics processor and/or other database/source circuitries 142, 144 of FIG. 1B).

At the call center (CC) side where activities are more directly associated with a receptionist's interactions involving the UI's FoVs, examples of specific activities include interactive voice recognition (IVR) operations to permit incoming callers to access information automatically via a voice response system of prerecorded messages without having to speak to the receptionist or an agent, and/or use of menu-driven options to have their calls routed to specific departments or specialists, with or without similar confidence assessment as described above in connection with the server/processing circuit assessing data from the above-noted examples (e.g., via 101 of FIG. 1A and/or 142, 144 of FIG. 1B). As depicted at the bottom of FIG. 1B, the server/processing circuit may route the incoming transaction to an agent, for example, via real or virtual system-based extension x1002, selected through the system's service-provided IVR experience. Each of these specific activities may be caused, enabled for automation (e.g., via the discerned call context or via the callee or caller ID), and disabled by the receptionist's interactions at the UI. For example, according to one configuration, one FoV section of the UI displays active calls with the FoV section displaying such a related processing status indicating how each active call is being processing in connection with the specific activity. According to another configuration, the FoV sections include one customized section in which the UI displays this related processing status.

Accordingly, with the example embodiment of the system shown in FIG. 1A, the related system depicted in FIG. 1B uses the UI to permit a receptionist to process, track and facilitate apparent automated self-service experiences for users by resolving inquiries discerned through the incoming interactions and/or effecting call-decision routing of incoming interactions to call-center agents or specialists.

In connection with the above-characterized embodiments including but not limited to those described in connection with FIGS. 1A and 1B, analytics-specific processing computer circuitry (e.g., 102, 110 of FIG. 1A or 146 of FIG. 1B) provides AI-based analyses to predict whether a certain call condition would occur. As an example, the user of the UI may use the UI to transfer a call to one or more specific agents based on answer rates and/or specific regions of the entity in a given time period. As discussed earlier, one or more sections of the FoV may be configured to customize notifications regarding such rates and/or to link (or block access) to certain agents such as by modifying entries as viewed in the FoV's directory listing section. The call answer rate can be based on general trends over time, such as identified patterns of agents in response to different events and/or situations. The patterns can be specific to an agent, e.g., Agent A takes time off when it snows more than three inches, and/or specific to a region, e.g., a particular region has 20% of agents unable to answer calls after it snows or rains more than three inches. Such patterns can be based on weather, local events (e.g., sporting events, political events, school calendar, such as scheduled days off, fundraisers and other), non-local events (e.g., national sporting events, religious holidays, general time of year) illness or other health related trends. As an example, a first entity may allow their agents to work remotely from home and a second entity may not. The second entity may be more greatly impacted by weather related events (e.g., more agents cannot make it to work and thus cannot answer calls) than the first entity. Such trends may be different for different locations and different demographic groups of agents. For example, agents of a particular age may be more likely to be unable to answer calls after a local sporting events than other agents, although embodiments are not so limited.

Figure 2A:
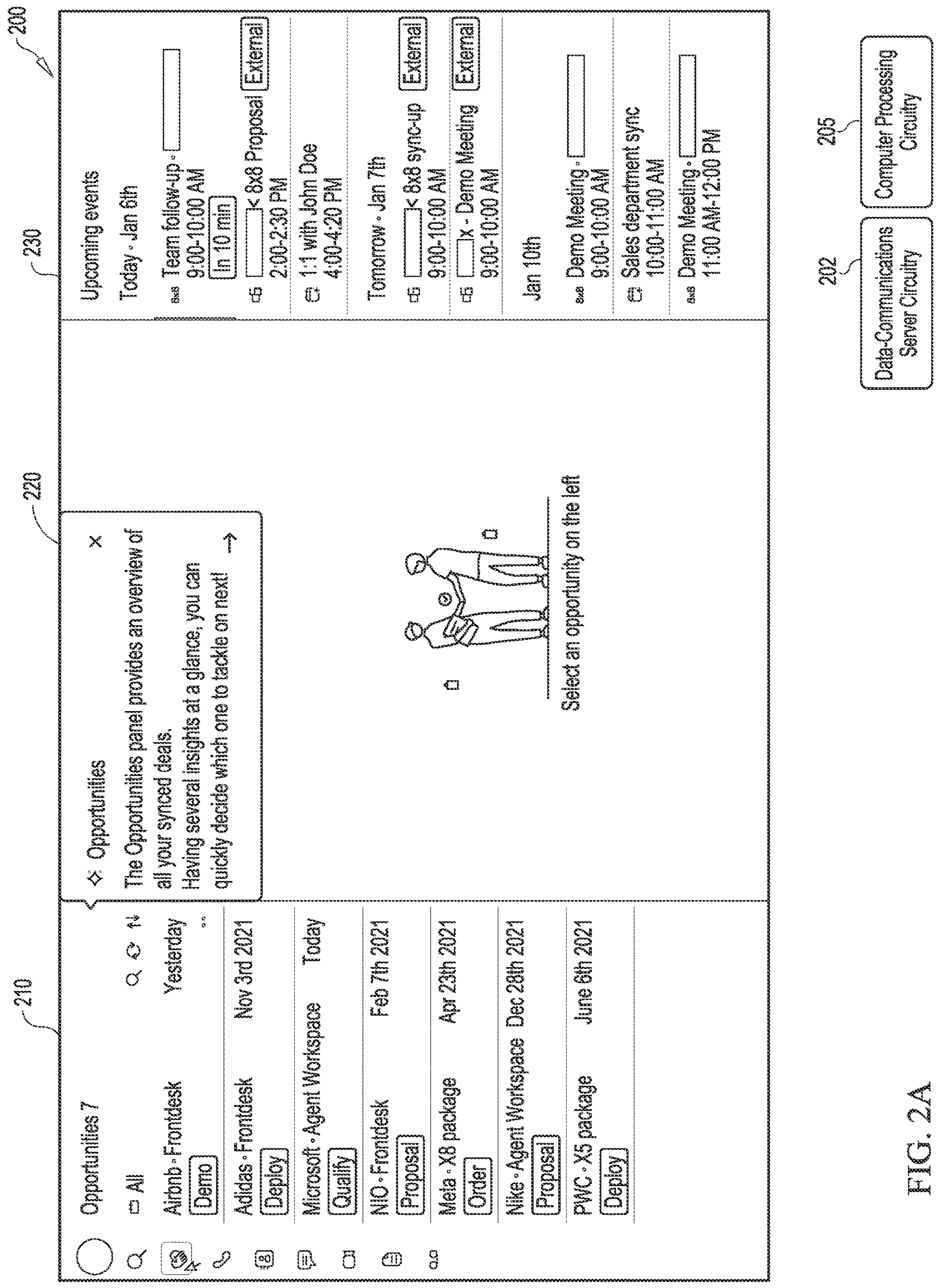
Figure 2B:
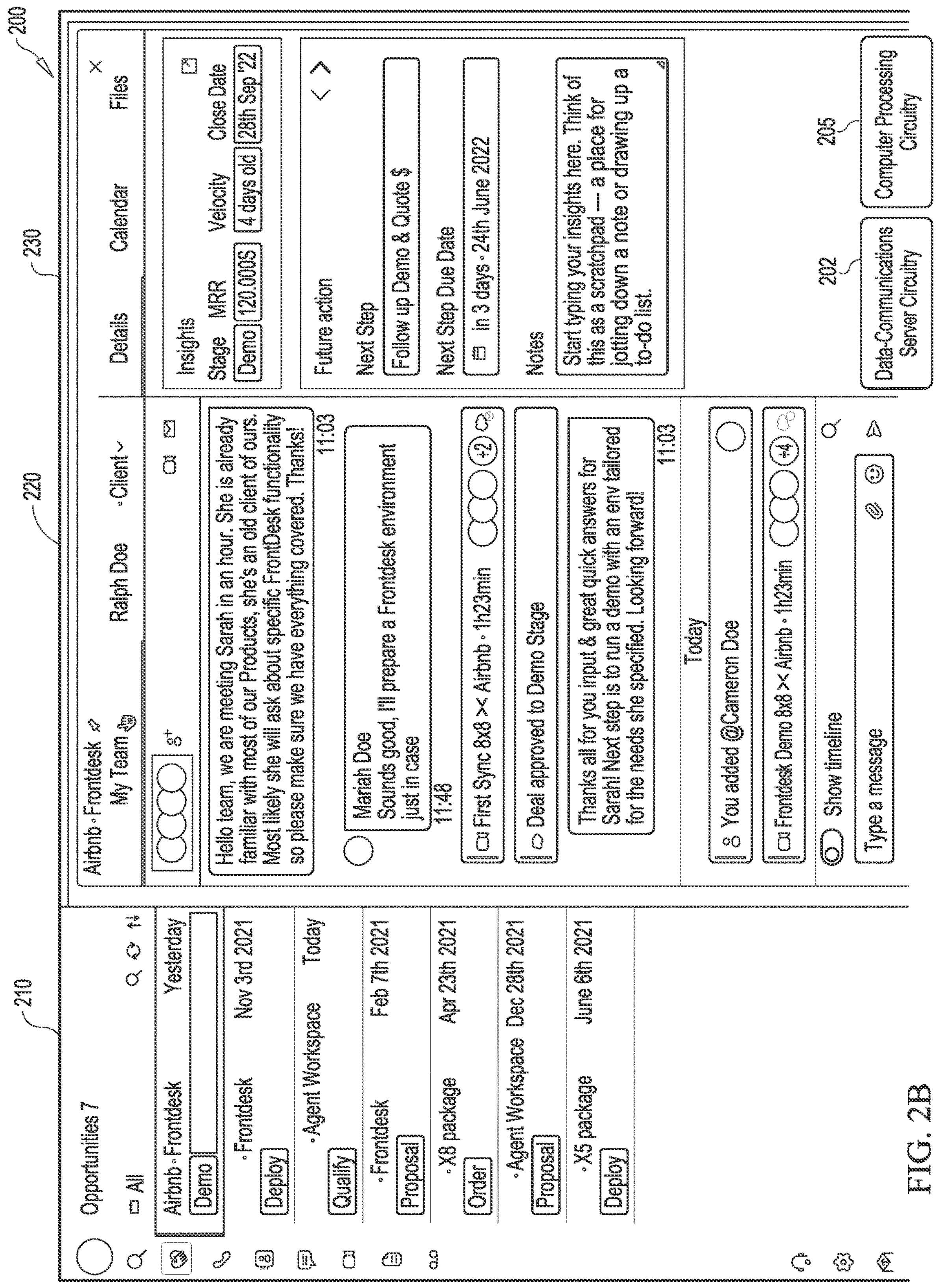

FIGS. 2A and 2B show first and second states of a UI system 200 for synchronizing data and communications across disparate platforms, in accordance with one or more embodiments. FIG. 2A shows a first state with respective panels integrated to display operational opportunities and characteristics thereof, and FIG. 2B shows a second state in which the respective panels are dynamically changed based on interoperation thereof. The system 200 includes configurable panes 210, 220 and 230, as may respectively depict operational opportunities, details regarding a selected one of the operational opportunities, and further data generated based on the operational opportunities and an endpoint at which the UI is provided.

The system 200 may be implemented in a variety of manners and with various supporting circuitry. For example, the system 200 may include data communication server circuitry 202 to convey data communications routed by a server of a data-communications system and to provide data-communications services for endpoint devices. The system 200 may also include a computing processor circuit 204, which provides the UI as shown for displaying respective sections of a FoV (field of view), and operates with the data communication server circuitry 202 to carry out various functions as may relate to the integration of data from disparate applications, security-related communication functions and others as characterized herein. For instance, the system 200 may be implemented with the data communications system shown in FIG. 1A, for providing a UI system such as shown to respective endpoint devices and integrating communications for presenting and processing date pertaining to operational opportunities. Similarly, the system 200 may be implemented with the UI-enabled computer processing circuit 146 shown in FIG. 1B, which may provide a user interface as shown.

In some implementations, the system 200 operates to synchronize operational opportunities based on an identification associated with the participant endpoint device, characteristics of the operational opportunities and search characteristics input to the participant endpoint device. This may involve accessing and synchronizing data sets generated by a plurality of applications and associated with the respective operational opportunities, for instance by interacting with multiple disparate applications (internal or external) to retrieve, synchronize and display opportunities. The synchronized data sets corresponding to the operational opportunities may be displayed at the endpoint device, as a FoV via the UI (e.g., as an opportunities panel depicted at 210). In response to a selection of one of the operational opportunities, data characterizing the selected operational opportunity may be displayed in an interaction panel at the endpoint device (e.g., as an opportunity interaction panel 220). In the state represented in FIG. 2A, an overview is shown in panel 220, and in the state represented in FIG. 2B, specific details corresponding to a selected opportunity are presented.

Further data displayed in the third panel 230 is may be presented based on the state of operation, with FIG. 2A depicting a list of upcoming events associated with a user of an endpoint device at which the data is displayed. In FIG. 2B, while the operational opportunities and data characterizing a selected operational opportunity is displayed, further data is be generated and displayed at the endpoint device via the UI panel 230 corresponding to the selected operational opportunity. This may include modifying the displayed further data based on contextual aspects of user interaction with the UI and the selected operational opportunity, therein providing a dynamically changing display panel corresponding to contextual aspects of the operational opportunities and inputs received at the endpoint device.

In various embodiments, the opportunity interaction panel 220 is implemented to provide an input pane for a user to generate communications, and is configured to transmit those communications over one or more of a multitude of disparate communications mediums. For instance, a textual input may be transformed into one or more types of communications for transmission via disparate mediums, such as via one or more disparate email platforms, messaging platforms, image-based platforms, and voice platforms.

Further, these communication types may be filtered to ensure security-based aspects of the respective communications are applied. For instance, where a user providing input to panel 220 may communicate with (e.g., company) internal and external recipients, security measures may facilitate certain internal communications and prevent those communications with external recipients. It has been recognized/discovered that such an approach may be useful when processing a communications input for delivery across multiple platforms, and for multiple disparate end users, avoiding inadvertent (or intentional) transmission of secure data to a recipient having restricted access.

A variety of types of displays may be utilized to suit particular applications. For instance, while a main screen display may have three panes in a composed UX experience as shown in FIGS. 2A and 2B, fewer or greater panes may be used. Referring to FIG. 2B by way of example, pane 210 may be implemented as an opportunities pane, pane 220 may be implemented as an opportunity interactions pane, and pane 230 may be implemented as a contextual details pane. Additional application components may be integrated in an existing or new pane. Communication application functionality is one such component, for example as may involve digital calling, presence indications, and other aspects that may be shared independently for internal and/or external contacts to help manage the progress of opportunities. Other views may be presented in addition to or overlapping other panes, such as may pertain to a directory of contacts, tasks (pop-up), and chat/messaging.

An opportunities pane may provide an overview of synchronized deals for a particular endpoint. This may be presented in a curated/prioritized manner for users, or may simply list all opportunities/deals retrieved from one or more channels. This information may be retrieved from a customer relationship management (CRM) system. Such an opportunities pane may highlight functionality for UX searching of a priorities pane, and may include a search icon (search functionality to search any opportunities), sync icon (continually sync data about opportunities from integrated channels), and an update management icon (bring in new opportunities or transfer opportunities to other agents/personnel or to different integrated channels for efficient management). Transfer functionality of such an "update management icon" may provide additional UX functionality to label priority of an opportunity for handling within an integrated channel (e.g., pertaining to a specific application), and may be labeled specific to an integrated channel to make handling more efficient. Various functions may be toggled on/off, for instance to help users understand UX, panes, functionality, and/or integration.

While some implementations may utilize a curated/filtered list of opportunities, other implementations may utilize AI modeling or an algorithm to curate a listing indicating a priority level for deals. Deals may be ordered according to priority level. Such curation may involve using one or more contextual factors associated with a deal, such as customer data, date, length/history of communications, personnel involved, priority indication, and state of deal (e.g., proposal, demo, order, signature deployment).

The opportunity interactions pane may allow users to select opportunities from left-hand "opportunity" pane and understand for a selected opportunity, current state, team, or collaboration. This pane may automatically update based on contextual suggestions. For example, if a specific opportunity is selected, the pane may reflect interactions that are specific to that opportunity. If the opportunity is un-selected, the UI may automatically revert back to a main or standard display. If a different opportunity is selected, details around interactions for the different opportunity are shown.

In some implementations, AI algorithms are applied to automatically suggest communication modalities, and for instance context to discuss with specific contacts. For example, an external contact may have a preferred medium/modality of contact which can be recommended. Also, a preferred medium (e.g., email or messaging) could have automatically populated content to provide context and help user efficiently communicate a though/idea.

The contextual details pane may change based on a context that a user of the endpoint is working in. For example, initially this pane may display as a schedule/event pane, however the UX data and functionality can change based on user selections and specific opportunities that the user is working with. A schedule/event pane may provide a list of events related to opportunities, such team meetings, internal and external milestones, and other aspects that can be visually differentiated for users in composed UX (e.g., "external" labeling). This pane can automatically update based on context selected or user UX selections. For instance, for specific opportunities that are selected, the UX can automatically replace a calendar pane with feature functional specific to opportunity (e.g., show "details" around opportunity, "calendar" or timeline for opportunity, and associated "files").

As a particular use-case scenario, an integrated UX may curate panes as follows. When a user selects an opportunity from the opportunity pane, a composed UX automatically updates an opportunity interaction pane and a contextual details pane to reflect context based on that user selection. For example, when a first opportunity in the listing is selected, an "opportunity room" UX pane may update to enable a user to view internal ("team") and external ("client") communications specific to that opportunity. The UX team enables users to toggle between different types of communications and communicate directly with context (from the composed UX) through different communication modalities (e.g., messaging, calls, email, chat rooms, etc.). Further, the content in the panes may be tailored to a specific contextual state of an engagement (e.g., corresponding to a state of progression of the engagement).

Panes may be implemented to provide an ability to communicate with "internal" or "external" contacts in real-time. For instance, a "meet now" icon may be utilized to schedule a meeting in real-time with team members directly through an integrated UX. Similar functionality exists for other types of communications (e.g., email, messaging). For a meeting, a link may be automatically sent to everyone in the meeting group. For emails or messages, email that is pre-populated with contacts (and possibly text/context) may be automatically generated. Further, other communication channels with external customers may be integrated, for instance using various communication platforms.

The contextual details pane may be updated with contextually relevant data for a selected opportunity, in a variety of manners. In some implementations, deal summary insights, milestones (including specific contextual labels such as stage of deal, MRR, deal velocity timeline, projects date for closing), previous meeting minutes, future actions, and other opportunity-related information may be provided.

The opportunity interaction pane and contextual details pane may interact with one another. For instance, specific meetings/interactions selected in the opportunity interaction pane may result in the contextual details pane being automatically updated to reflect those specific meeting notes. For editing purposes, meeting notes may be modified, new notes may be created, etc.

Content added in the UX can be automatically synced with integrated channels. For instance, if a user selects "files" all files (of any type) can be shown for that specific opportunity. Users can also update file listings including any new files, deleting files, and more, with the files being automatically synchronized across integrated channels. Further, files shared with "internal" and "external" contacts can be so indicated.

Figure 3A:
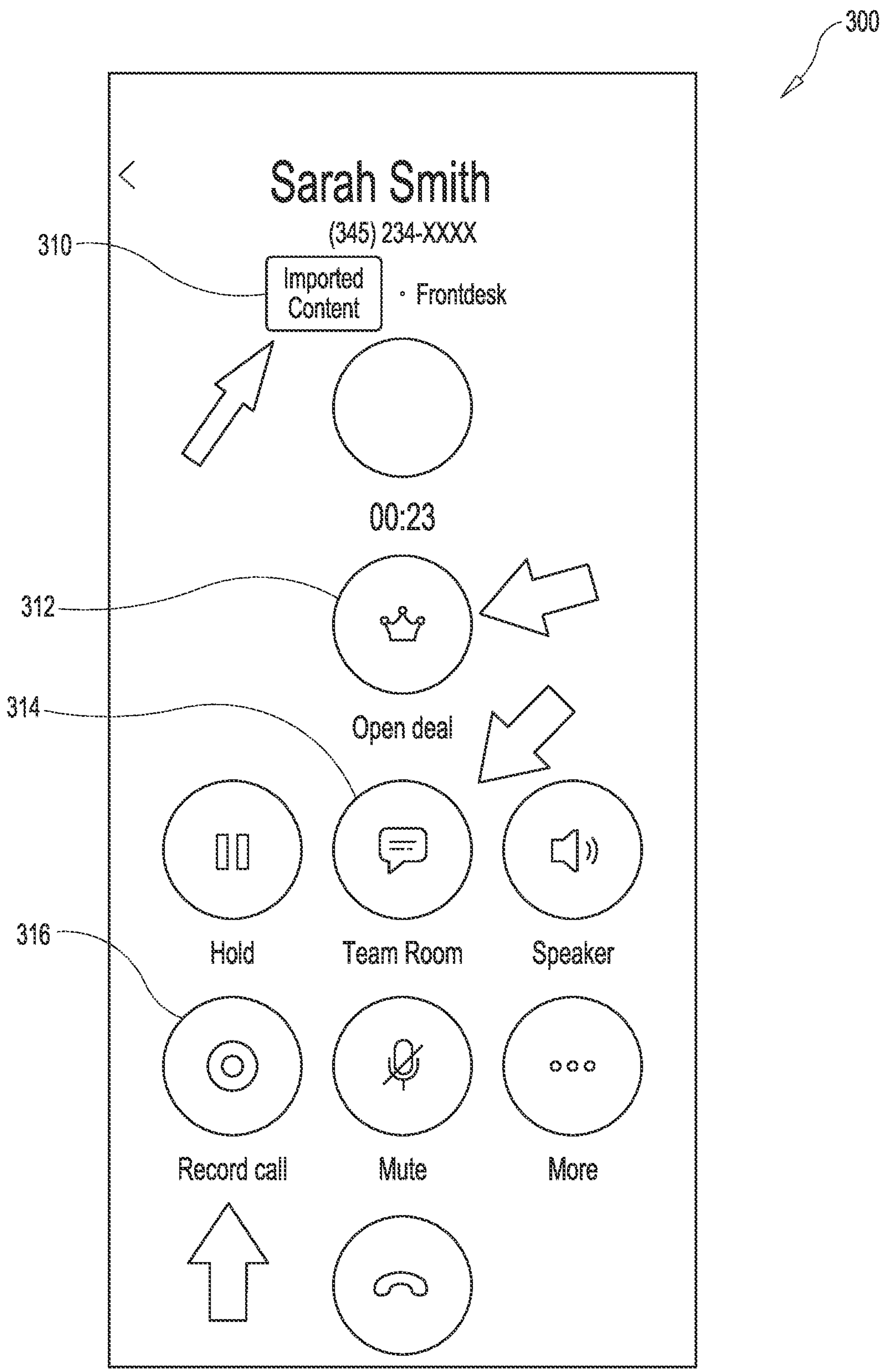
Figure 3B:
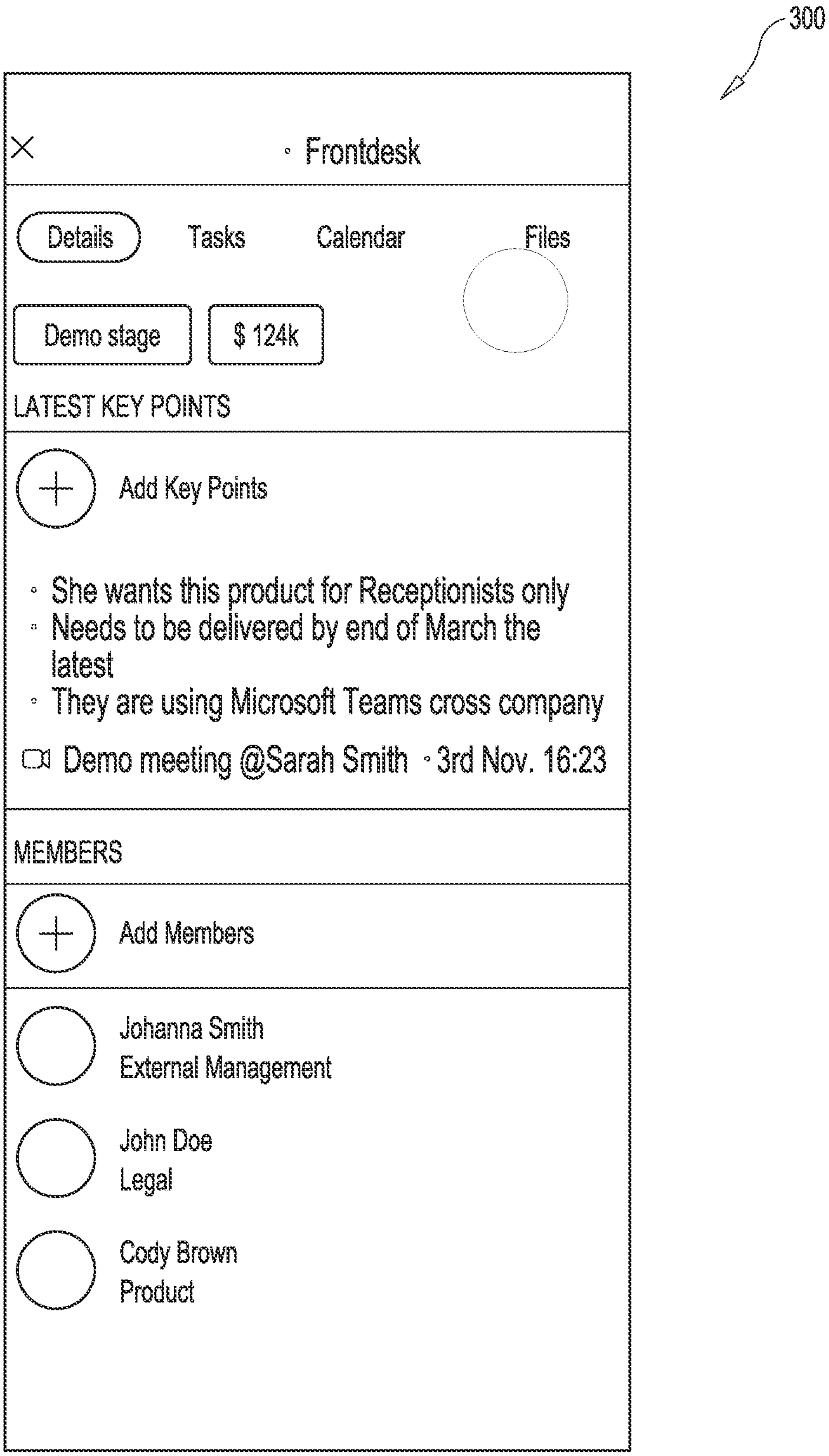
Figure 3C:
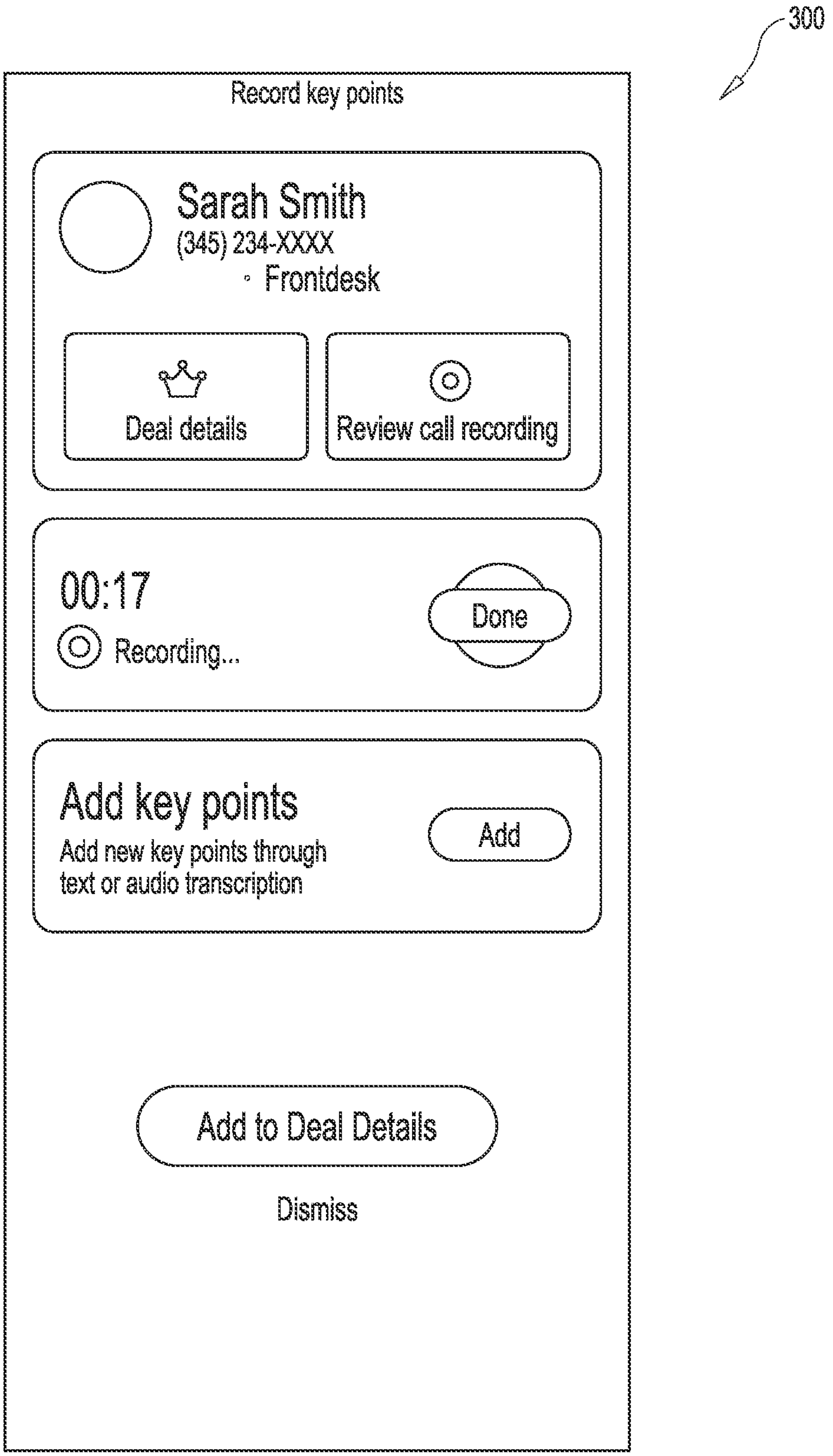

FIGS. 3A-3C show a mobile-based UI system 300, as may be implemented in accordance with one or more embodiments. FIG. 3A shows a first state in which data corresponding to an opportunity is presented with an incoming data communication, such as a phone call. Information in the incoming communication is assessed and used to link/synchronize corresponding opportunity data, and to present imported content 310, an opportunity (e.g., "deal") data link 312, a related team room link 314, and an operation link 316 to record the incoming communication.

FIG. 3B shows a second state in which opportunity data synchronized to the incoming data communication is accessed and displayed, for example in response to a user selection of the data link 312. Various options may be presented, including those shown to add members and notes associated with the opportunity data. FIG. 3C shows a third state in which a recording function is enabled (e.g., in response to selection of operation link 316), along with an integrated link to view and/or modify details corresponding to the opportunity data. Similar to the second state in FIG. 3B, key points may be added in connection with the opportunity data.

Referring again to FIGS. 2A, 2B, the systems shown therein may be integrated with those depicted in FIGS. 3A, 3B and 3C. For instance, where a user operates on an endpoint having a larger screen, such as a laptop, the systems in FIGS. 2A and 2B can be presented thereat. When that user switches to another endpoint, the data communications server circuitry 202 and computer processing circuitry 205 may operate to modify the systems for presentation thereat, and for example if the endpoint is a mobile device, modify the generated data in the context of communications and system operability for presentation. Further, as noted above data input on a mobile device (e.g., as may be added in FIG. 3B), the computer processing circuitry may process that input. For instance, a ML/AI algorithm may be implemented to analyze the input data and provide suggestions such as for adding new members/users to integrate into a business meeting, or for follow-up methods of communication that may be preferred in similar business scenarios. From there, those data insights can be integrated into the desktop experience and viewable while the user is using the desktop version.

Consistent with the above, various types of screens may be implemented to suit particular applications, for instance to present data corresponding to respective panels in a mobile device with a relatively small screen. For instance, were a telephone call is received and identified as being sourced from a known user synchronized to a particular opportunity, information regarding that user and the opportunity may be presented on a call screen (e.g., as in FIG. 3A). A user may then automatically access data around the opportunity associated with that user. For example, "key points" of an offer may be provided to apprise the user of a summary that can be used to facilitate call communication without having to go through and search emails, communications, files, etc. (e.g., as in FIG. 3B). This approach may further apprise the recipient of the call (at his/her endpoint device) of updated status information for the opportunity, for instance as may have been provided through another user at a different endpoint. The user may choose go to a specific chat "team room" such as "internal" or "external" chat rooms, threads, etc., and may record calls (which can be automatically synchronized). Once a call is completed, a UX summary can be presented in-app for the user. This may involve providing deal details and recordings, creating a recording (and playing it back) for instance as depicted in FIG. 3C, adding to contextual data (including opportunity/deal details, key points, etc.) as well as provide UX control to dismiss summary notification, share it with other users, etc. Such data can be automatically synced with other applications.

As examples, the Specification describes and/or illustrates aspects useful for implementing the claimed disclosure by way of various circuits or circuitry which may be illustrated as or using terms such as blocks, modules, device, system, unit, controller, etc. and/or other circuit-type depictions (e.g., various reference numerals in FIGS. 1A and 1B depict blocks/modules as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing a first-named first activity and also a second-named activity.

For example, in certain of the embodiments disclosed in the instant provisional application, one or more modules are discrete logic circuits or programmable logic circuits configured and arranged for implementing these operations/activities, as may be carried out in the approaches shown in FIGS. 1A and 1B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with the AI models may be used by the programmable computer processing circuitry to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A communications system, comprising:
- data communication server circuitry to provide data-communications services, including routing data communications on behalf of endpoint devices; and
- a computing processor circuit to provide a user interface (UI) that displays respective sections of a field of view (FoV), the computing processor circuit being operable with the data communication server circuitry to, for each of the endpoint devices:
  - synchronize operational opportunities based on an identification associated with the endpoint device, characteristics of the operational opportunities, and search characteristics input to the endpoint device, wherein a respective operational opportunity of the operations opportunities is synchronized by:
    - accessing data sets generated by a plurality of disparate applications and associated with the respective operational opportunity, and
    - synchronizing the respective operational opportunity across the data sets generated by the plurality of disparate applications with the information associated with the respective operational opportunity from the data sets;
  - display the synchronized data sets corresponding to the operational opportunities at the endpoint device, as the FoV via the UI, wherein the UI displays a selected operational opportunity and data characterizing the selected operational opportunity in an interaction panel at the endpoint device;
  - while the operational opportunities and data characterizing the selected operational opportunity are displayed, generate and display further data at the endpoint device via the UI, including modifying the displayed further data based on contextual aspects of user interaction with the UI and the selected operational opportunity, thereby providing a dynamically changing display panel corresponding to contextual aspects of the operational opportunities and inputs received at the endpoint device.

2. The system of claim 1, wherein the computing processor circuit is to establish at least one communication channel between the endpoint device and an end user corresponding to the selected operational opportunity, and to display data, from the data communication server circuitry, characterizing the at least one communication channel.

3. The system of claim 2, wherein the computing processor circuit is to select the communication channel based on the contextual aspects of the user interaction.

4. The system of claim 1, wherein the computing processor circuit is to assess the contextual aspects of user interaction with the UI and the selected operational opportunity, for multiple different users and operational opportunities, and to modify the displayed further data for the selected operational opportunity based on the assessed contextual aspects.

5. The system of claim 1, wherein the computing processor circuit is to assess multiple operational opportunities and assign a priority level to respective ones thereof, and to display the synchronized data sets corresponding to the operational opportunities at the endpoint device based on the assigned priority level and characteristics of the endpoint device.

6. The system of claim 1, wherein the computing processor circuit includes a secure gateway to, for respective ones of the operational opportunities synchronized to the endpoint device, filter data communicated from the data communication server circuitry in accordance with each respective operational opportunity based on security characteristics associated with the communicated data.

7. The system of claim 1, wherein the computing processor circuit is to synchronize the operational opportunities by interacting with the plurality of disparate applications to retrieve, synchronize, and display characteristics of sets of data including data that identifies people, companies, operations to be performed, and data for establishing communication channels with the identified people and companies.

8. The system of claim 1, wherein the computing processor circuit is to reassign data corresponding to operational opportunities from one of the endpoint devices to another of the endpoint devices in response to changes in characteristics of the operational opportunities and characteristics of the endpoint devices.

9. The system of claim 1, wherein the computing processor circuit is to display the data characterizing the selected operational opportunity in the interaction panel at the endpoint device by displaying data characterizing interactions specific to the selected opportunity, and in response to the operational opportunity being deselected, cease displaying the interactions specific to the selected opportunity.

10. The system of claim 1, wherein the computing processor circuit is to display the further data by filtering communications channel options based upon a destined recipient of the communications and a security characteristic associated with the destination.

11. The system of claim 1, wherein the computing processor circuit is to receive data from a user in a data input panel, and to communicate the data received via the input panel to other endpoint devices via a plurality of disparate communication modalities.

12. A method comprising:

providing a user interface (UI) that displays respective sections of a FoV (field of view) for each of a plurality of endpoint devices;

synchronizing data sets generated by a plurality of disparate applications and associated with respective operational opportunities, the synchronizing being carried out based on an identification associated with the endpoint devices, characteristics of the operational opportunities, and search characteristics input to the endpoint device, wherein a respective operational opportunity of the respective operational opportunities is synchronized by:

accessing data sets generated by a plurality of disparate applications and associated with the respective operational opportunity, and synchronizing the respective operational opportunity across the data sets generated by the plurality of disparate applications with the information associated with the respective operational opportunity from the data sets; and at one of the endpoint devices:

displaying the synchronized data sets corresponding to the operational opportunities and the one of the endpoint devices via the UI, wherein the UI displays a selected operational opportunity and data characterizing the selected operational opportunity in an interaction panel at the endpoint device; and while the operational opportunities and data characterizing the selected operational opportunity are displayed, generating and displaying further data via the UI, including modifying the displayed further data based on contextual aspects of user interaction with the UI and the selected operational opportunity, thereby providing a dynamically changing display panel corresponding to contextual aspects of the operational opportunities and inputs received at the one of the endpoint devices.

13. The method of claim 12, further including establishing at least one communication channel between the one of the endpoint devices and an end user corresponding to the selected operational opportunity, and displaying data characterizing the at least one communication channel.

14. The method of claim 12, including assessing contextual aspects of user interaction with the UI and the selected operational opportunity, for multiple different users and operational opportunities, and modifying the displayed further data for the selected operational opportunity based on the assessed contextual aspects.

15. The method of claim 12, including:

assessing multiple operational opportunities;

assigning a priority level to respective ones of the assessed operational opportunities; and displaying the synchronized data sets corresponding to the operational opportunities at the endpoint device based on the assigned priority level and characteristics of the endpoint device.

16. The method of claim 12, including, for respective ones of the operational opportunities synchronized to the endpoint device, filtering data communicated in accordance with each respective one of the operational opportunities based on security characteristics associated with the communicated data.

17. An apparatus comprising:

server circuitry to convey data with a plurality of endpoint devices; and a computing processor circuit, the computing processor circuit being cooperatively operable with the server circuitry to provide the data to each of the plurality of endpoint devices and to facilitate communications between the endpoint devices and remote users, including:

synchronizing data sets generated by a plurality of disparate applications and associated with respective operational opportunities, based on each of an identification associated with the endpoint devices, characteristics of the operational opportunities, and data input to the endpoint devices, wherein a respective operational opportunity of the respective operational opportunities is synchronized by:

accessing data sets generated by a plurality of disparate applications and associated with the respective operational opportunity, and synchronizing the respective operational opportunity across the data sets generated by the plurality of disparate applications with the information associated with the respective operational opportunity from the data sets;

displaying the synchronized data sets at respective ones of the endpoint devices in a user interface (UI), wherein the UI displays a selected operational opportunity and data characterizing the selected operational opportunity in an interaction panel at the endpoint device; and while the operational opportunities and data characterizing the selected operational opportunity are displayed, modifying displayed data based on contextual aspects of user interaction with the UI and the selected operational opportunity, thereby providing a dynamically changing display panel corresponding to contextual aspects of the operational opportunities and inputs received at the one of the endpoint devices.

18. The apparatus of claim 17, wherein the computing processor circuit is to establish at least one communication channel between the endpoint device and an end user corresponding to the selected operational opportunity, and to display data, from the data communication server circuitry, characterizing the at least one communication channel.

19. The apparatus of claim 17, wherein the computing processor circuit is to select the communication channel based on the contextual aspects of the user interaction and to filter communications channel options based upon a destined recipient of the communications and a security characteristic associated with the destination, thereby providing disparate channel-based security control for respective recipients.

20. The apparatus of claim 17, wherein the computing processor circuit is to assess contextual aspects of user interaction with operational opportunities over time, for multiple different users and operational opportunities, and to modify the displayed data for subsequently selected operational opportunities based on the assessed contextual aspects.

* * * * *